(12) United States Patent
Hagiwara et al.

(10) Patent No.: US 7,769,013 B2
(45) Date of Patent: Aug. 3, 2010

(54) COMMUNICATION APPARATUS

(75) Inventors: Shu Hagiwara, Taito-ku (JP); Suguru Nishio, Fukuroi (JP); Shingo Tsunoda, Kawasaki (JP)

(73) Assignee: Next Magic Incorporated (JP)

( * ) Notice: Subject to any disclaimer, the term of this patent is extended or adjusted under 35 U.S.C. 154(b) by 349 days.

(21) Appl. No.: 11/915,648

(22) PCT Filed: May 22, 2006

(86) PCT No.: PCT/JP2006/310107

§ 371 (c)(1),
(2), (4) Date: Feb. 7, 2008

(87) PCT Pub. No.: WO2006/132072

PCT Pub. Date: Dec. 14, 2006

(65) Prior Publication Data

US 2009/0262756 A1 Oct. 22, 2009

(30) Foreign Application Priority Data

Jun. 10, 2005 (JP) ............................. 2005-170390

(51) Int. Cl.
*H04L 12/58* (2006.01)
(52) U.S. Cl. ...................... 370/392; 370/395.5; 370/389
(58) Field of Classification Search .................. None
See application file for complete search history.

(56) References Cited

U.S. PATENT DOCUMENTS

| | | | |
|---|---|---|---|
| 6,480,497 B1 | 11/2002 | Flammer, III et al. | |
| 6,640,087 B2 | 10/2003 | Reed et al. | |
| 7,586,888 B2 * | 9/2009 | Wang | 370/338 |
| 7,630,736 B2 * | 12/2009 | Wang | 455/553.1 |
| 2003/0179751 A1 * | 9/2003 | Omae et al. | 370/392 |
| 2003/0231657 A1 * | 12/2003 | Poon et al. | 370/469 |
| 2004/0071142 A1 * | 4/2004 | Moriwaki et al. | 370/392 |

FOREIGN PATENT DOCUMENTS

| | | |
|---|---|---|
| JP | 01-291553 | 11/1989 |
| JP | 2004-048728 | 2/2004 |
| JP | 2004-064678 | 2/2004 |
| JP | 2005-143001 | 6/2005 |

* cited by examiner

*Primary Examiner*—Huy D Vu
*Assistant Examiner*—Zewdu Beyen
(74) *Attorney, Agent, or Firm*—Studebaker & Brackett PC; Donald R. Studebaker

(57) ABSTRACT

A communication apparatus according to the invention can be applied to constitute each of relay nodes in a novel wireless communication network, in which the number of relaying stages formed with the relay nodes can be freely set without restriction by the amount of communication information to be processed, and consequently, a multistage-relayed communication extending over a long distance can be carried out to realize a long-distance communication. The communication apparatus comprises temporary and main managing portions 16 and 18 for controlling temporary and main memory means 15 and 17 and an operation control portion 20, wherein the operation control portion 20 is operative to cause the temporary and main managing portions 16 and 18 to perform control operations for transform an input data frame to be a modified data frame containing transfer mode information representing one of diffusion, percolation and convergence transfer modes determined based on original transfer mode information and particular identification information contained in the detected data frame and history information preserved in the main memory means 17, for causing the modified data frame of the diffusion or convergence transfer mode to be subjected to relay and for causing the modified data frame of the percolation transfer mode to be subjected to relay at a predetermined probability or to deletion.

6 Claims, 8 Drawing Sheets

FIG. 3A
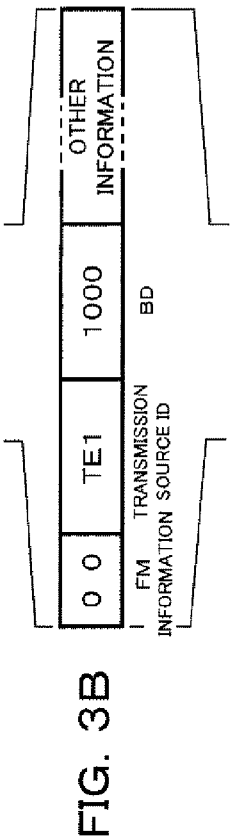
FIG. 3B
FIG. 3C
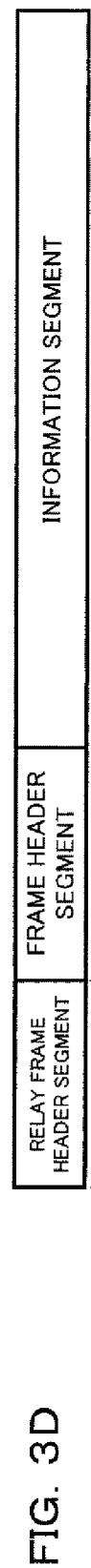
FIG. 3D
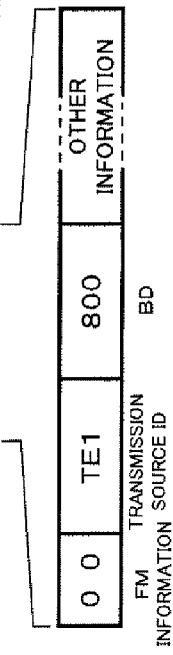
FIG. 3E

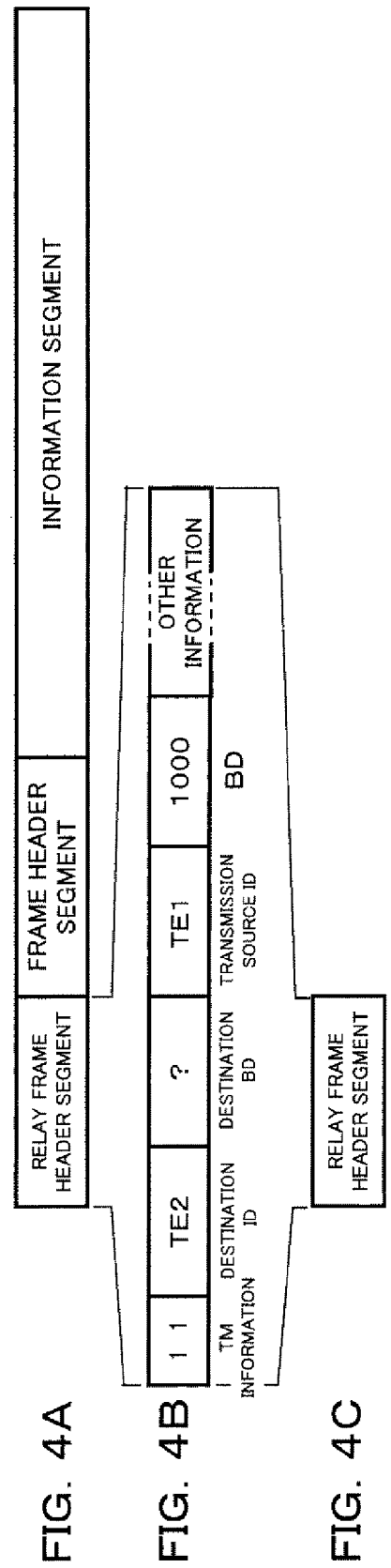

COMMUNICATION APPARATUS

TECHNICAL FIELD

The present invention relates to a communication apparatus which can be applied, for example, to constitute a relay node provided for relaying, as occasion demands, an information signal as the subject of communication in a communication network wherein mutual communication between two communication terminals or among a plurality of communication terminals is performed.

TECHNICAL BACKGROUND

Mutual information signal communication between two communication terminals, such as portable telephones, personal computers or the like, is usually carried out through a predetermined communication network in the form of wireless system or wire system. There has been proposed a relatively new style of such a communication network by the name of mesh network.

The mesh network is different from known communication networks each constituted with a base node which functions as a central controller and a plurality of relay nodes, each of which operates under the control by the base node. In the mesh network, any node corresponding to the base node functioning as the central controller is not provided but a plurality of relay nodes are provided in such a manner that each contiguous two of the relay nodes are placed with their communication areas overlapping partially with each other so that communication paths extend in a reticulated pattern. With the mesh network, the following advantages can be obtained. For example, when a certain one of the relay nodes provided in the mesh network is put in an obstructive condition for interrupting communication temporarily, the communication is rapidly revived through another relay node provided in the mesh network. In addition, it is easy to add a new relay node to the network.

The mesh network constituted with a plurality of relay nodes wherein communication between a communication terminal and the relay node or between the relay nodes is carried out by means of wireless is named a so called wireless mesh network. With regard to the wireless mesh network, various technical improvements have been proposed. For example, with one of such technical improvements, a communication signal which is received and transmitted by each of the relay nodes provided in the wireless mesh network is changed in its signal characteristics, such as a rate of signal, a manner of modulation, a frequency band and so on, in response to the signal receiving capacity of the relay node so that the amount of information processed in a predetermined time in the wireless mesh network is increased (as disclosed in, for example, patent document 1). Further, with another technical improvement, each of the relay nodes constituting the wireless mesh network is provided with a directive antenna system and the directivity of antenna determined by the directive antenna system is selected in response to the communication carried out through the subject relay node so that the communication efficacy in the wireless mesh network is improved (as disclosed in, for example, patent document 2).

The patent document 1: U.S. Pat. No. 6,480,497
The patent document 2: U.S. Pat. No. 6,640,087

DISCLOSURE OF THE INVENTION

Problems Intended to be Solved by the Invention

In the previously proposed wireless mesh network as described above, the number of relaying stages formed by the relay nodes is restricted in general to be less than twenty by the amount of communication channel information which is information of communication path in the wireless mesh network and received and transmitted through each of the relay nodes constituting the wireless mesh network. It is very difficult in the wireless mesh network to increase the number of relaying stages formed by the relay nodes to exceed twenty by a large margin so that a multistage-relayed communication extends over a long distance because the amount of the communication channel information received and transmitted through each of the relay nodes is extremely increased to be not disposable.

It is deemed that the restrictions on the number of relaying stages formed by the relay nodes in the previously proposed wireless mesh network, which obstructs a long-distance communication, results principally from an algorism adopted in the relay nodes constituting the wireless mesh network, which is operative to seek always the best relaying path for each communication in the wireless mesh network. Therefore, the above mentioned restriction on the number of relaying stages formed by the relay nodes brought about in the previously proposed wireless mesh network results from the function which each of the relay nodes constituting the wireless mesh network.

Accordingly, it is an object of the present invention to provide a communication apparatus which can be applied to constitute each of relay nodes provided for constituting a novel wireless communication network, with which advantages exceeding the advantages obtained with the known wireless mesh network are obtained, and in which the number of relaying stages formed by the relay nodes can be freely set without restriction by the amount of communication information to be processed and, as a result, a multistage-relayed communication extending over a long distance can be carried out to realize a long-distance communication.

Approach to Solve the Problems

According to the invention claimed in any one of claims 1 to 6 of the present application (hereinafter, referred to as the present invention), there is provided a communication apparatus comprising a signal receiving and transmitting portion operative to receive an input communication signal for obtaining an input information signal and to transmit an output communication signal based on an output information signal; a reassembling and segmenting portion operative to cause the input information signal to be subjected to reassembling process for obtaining first framed data which form a data frame containing a header segment and an information segment and to cause second framed data which form a data frame containing a processed header segment and an information segment to be subjected to segmenting process for obtaining the output information signal; temporary memory means for storing temporarily the first framed data obtained from the reassembling and segmenting portion and for storing temporarily the second framed data and then discharging the second framed data stored therein to the reassembling and segmenting portion; main memory means for storing therein identification information contained in the data frame formed by the first framed data stored in the temporary memory means, preserving the stored identification information as history information as occasion demands, and discharging the stored identification information or the stored identification information having been subjected to modifying process to the temporary memory means as processed identification information so as to be provided in the processed header segment contained in the data frame formed by the second framed data; a temporary managing portion operative to control operations in the temporary memory means for storing temporarily therein the first and second framed data; a main managing portion operative to control operations in the main memory means for storing therein the identification information, preserving the history information and discharging the processed identification information; and an operation control portion operative, when the data frame formed by the first framed data obtained form the reassembling and segmenting portion is detected, to cause the temporary managing portion and the main managing portion to carry out a first control operation, with which the detected data frame is transformed to be a modified data frame containing a header segment wherein a transfer mode information representing one of a diffusion transfer mode, a percolation transfer mode and a convergence transfer mode, which is determined based on original transfer mode information and particular identification information both provided in the header segment contained in the detected data frame and the history information preserved in the main memory means, the modified data frame containing the header segment wherein the transfer mode information representing the diffusion transfer mode or the convergence transfer mode is provided is positively discharged in the form of the second framed data from the temporary memory means to the reassembling and segmenting portion, and the modified data frame containing the header segment wherein the transfer mode information representing the percolation transfer mode is provided is discharged at a predetermined probability in the form of the second framed data from the temporary memory means to the reassembling and segmenting portion or deleted without being discharged, or a second control operation, with which the detected data frame is deleted in response to a transfer mode information and a predetermined identification information both provided in the header segment contained in the detected data frame and the history information preserved in the main memory means, wherein in the diffusion transfer mode, the data frame containing the header segment wherein the transfer mode information representing the diffusion transfer mode is provided is identical with a data frame transmitted from a transmission source or a data frame transmitted diffusively, in the percolation transfer mode, the data frame containing the header segment wherein the transfer mode information representing the percolation transfer mode is provided is identical with a data frame transmitted at a predetermined probability, and in the convergence transfer mode, the data frame containing the header segment wherein the transfer mode information representing the convergence transfer mode is provided is identical with a data frame transmitted convergently toward a destination thereof.

The above mentioned particular identification information is, for example, information representing the transmission source or the destination or information representing a value which varies at every transmission of the detected frame data after the first transmission thereof at the transmission source.

In the communication apparatus thus constituted in accordance with the present invention, when the data frame formed by the first framed data obtained from the reassembling and segmenting portion is detected, the temporary managing portion and the main managing portion, each of which operates under the control by the operation control portion, carry out the first control operation or the second control operation. With the first control operation, the transfer mode information which is to be provided in the header segment contained in the modified data frame is determined based on the original transfer mode information and the particular identification information both provided in the header segment contained in the detected data frame and the history information preserved in the main memory means, the detected data frame is transformed to be the modified data frame containing the header segment wherein the determined transfer mode information is provided, and the modified data frame thus obtained is positively discharged in the form of the second framed data from the first memory means to the reassembling and segmenting portion or discharged at the predetermined probability in the form of the second framed data from the first memory means to the reassembling and segmenting portion or deleted in response to the determined transfer mode information. With the second control operation, the detected data frame is deleted in response to the transfer mode information and the predetermined identification information both provided in the header segment contained in the detected data frame and the history information preserved in the main memory means. When the modified data frame containing the header segment wherein the determined transfer mode information is provided is discharged in the form of the second framed data from the first memory means to the reassembling and segmenting portion in the form of the second framed data, the output information signal produced based on the second framed data is supplied to the signal receiving and transmitting portion from the reassembling and segmenting portion and then the output communication signal based on the output information signal thus supplied is transmitted from the signal receiving and transmitting portion, so that the detected data frame is transferred as the modified date frame containing the header segment wherein the determined transfer mode information is provided.

In the first control operation carried out by the temporary managing portion and the main managing portion in such a manner as described above, the transfer mode represented by the determined transfer mode information is one of the diffusion transfer mode in which the modified data frame containing the header segment wherein the transfer mode information representing the diffusion transfer mode is provided is identical with the data frame transmitted from the transmission source of the same or the data frame transmitted diffusively, the percolation transfer mode in which the modified data frame containing the header segment wherein the transfer mode information representing the percolation transfer mode is provided is identical with the data frame transmitted at the predetermined probability, and the convergence transfer mode in which the modified data frame containing the header segment wherein the transfer mode information representing the convergence transfer mode is provided is identical with the data frame transmitted convergently toward the destination. The modified data frame containing the header segment wherein the determined transfer mode information representing the diffusion mode or the convergence transfer mode is provided is positively discharged in the form of the second framed data from the temporary memory means to the reassembling and segmenting portion and the modified data frame containing the header segment wherein the determined transfer mode information representing the percolation transfer mode is provided is discharged at the predetermined possibility in the form of the second framed data from the temporary memory means to the reassembling and segmenting portion or deleted.

Further, when the detected data frame is transformed to be the modified data frame containing the header segment wherein the determined transfer mode information is provided, a control operation for preventing the transfer mode information provided in the header segment contained in the modified data frame from changing or for changing the transfer mode information provided in the header segment contained in the modified data frame into a different transfer mode information, is also carried out by the temporary managing portion and the main managing portion.

Effect and Advantages of the Invention

In the communication apparatus according to the present invention, when the data frame containing the header segment and the information segment, which is obtained based on the input communication signal received by the signal receiving and transmitting portion, is detected, the control operations with which the detected data frame is transferred as the modified data frame containing the header segment wherein the transfer mode information representing the diffusion transfer mode, the percolation transfer mode or the convergence transfer mode is provided when the transfer of the detected data frame ought to be done and the detected data frame is deleted when there is no necessity for transferring the detected data frame, is autonomously carried out. These control operations can be carried out without using any communication channel information related to the data frame containing the header segment and the information segment and obtained based on the input communication signal received by the signal receiving and transmitting portion and regardless of the number of transfers, that is, the number of relaying stages.

Therefore, when the communication apparatus according to the present invention is applied to constitute each of relay nodes provided in a wireless mesh network, communication information from a transmission source is relayed by the relay nodes to be transferred to a destination with the number of relaying stages which can be freely set without restriction by the amount of communication information to be processed.

Consequently, the communication apparatus according to the present invention can be applied to constitute each of relay nodes provided for constituting a novel wireless communication network, with which advantages exceeding the advantages obtained with the known wireless mesh network are obtained, and in which the number of relaying stages formed by the relay nodes can be freely set without restriction by the amount of communication information to be processed and, as a result, a multistage-relayed communication extending over the long distance can be carried out to realize a long-distance communication.

BRIEF DESCRIPTION OF THE DRAWINGS

FIGS. 3A to 3E are schematic illustrations showing examples of data formats each representing an allocation of framed data or a part of the framed data obtained in the embodiment shown in FIG. 2;

FIGS. 4A to 4C are schematic illustrations showing examples of data formats each representing an allocation of framed data or a part of the framed data obtained in the embodiment shown in FIG. 2;

DESCRIPTION OF REFERENCES IN THE DRAWINGS

11a~11i~11nx . . . relay nodes, 12, 13a to 13n . . . signal receiving and transmitting portions, 14 . . . reassembling and segmenting portion, 15 . . . temporary memory means, 16 . . . temporary managing portion, 17 . . . main memory means, 18 . . . main managing portion, 20 . . . operation control portion

Embodiment Most Preferable for Working of the Invention

An embodiment most preferable for the working of the present invention will be explained below, together with a communication network to which the embodiment can be applied.

Figure 1:
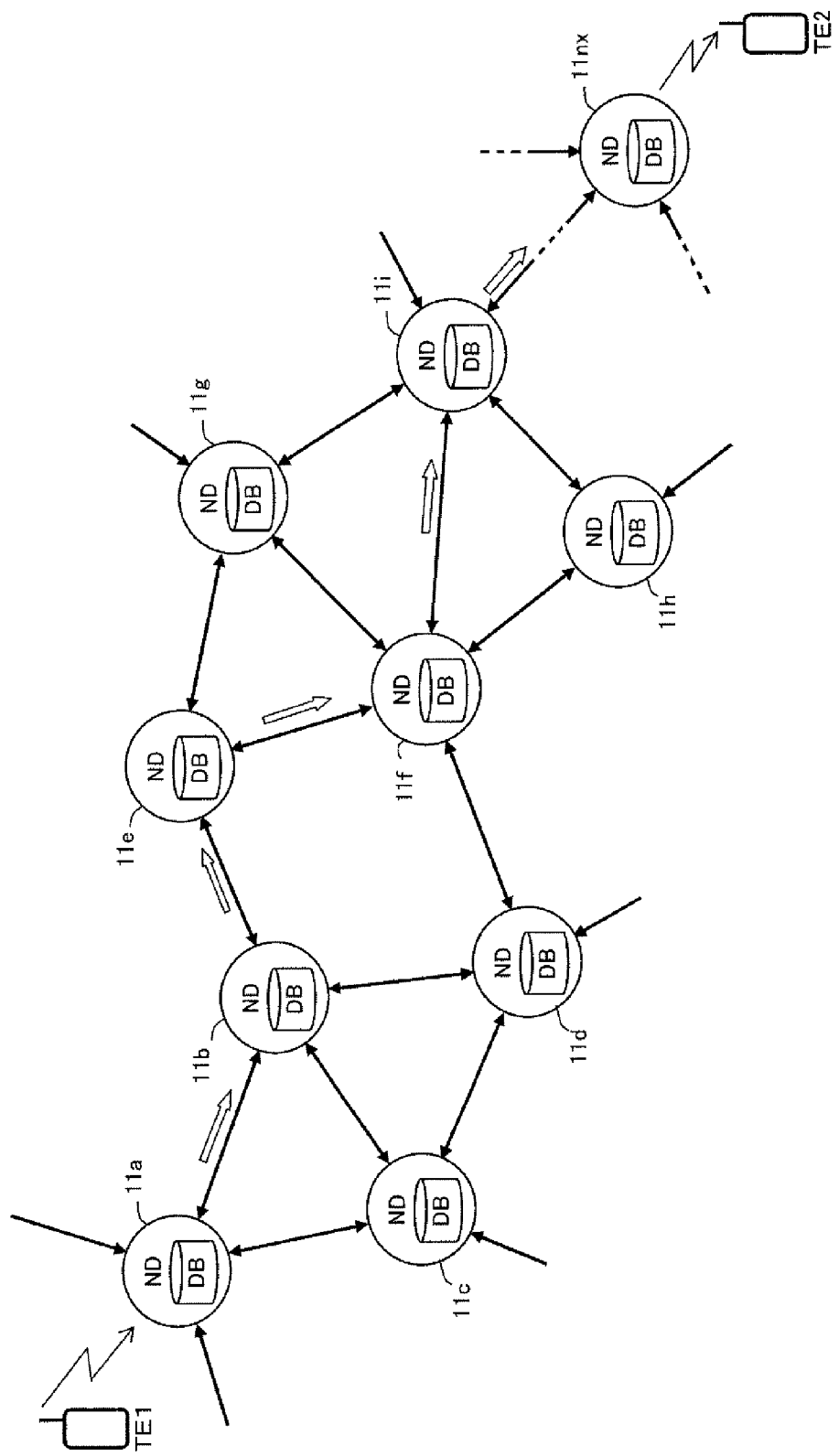
FIG. 1 is a schematic illustration showing an example of a wireless communication network constituted with a plurality of relay nodes, each of which can be constituted with an embodiment of communication apparatus according to the present invention, together with communication terminals.

FIG. 1 shows an example of a wireless communication network constituted with a plurality of relay nodes, each of which is able to be constituted with a communication apparatus according to the present invention, together with communication terminals.

In the wireless communication network shown in FIG. 1, a plurality of relay nodes 11a~11i~11nx, each of which is labeled "ND" are dispersedly arranged in such a manner that each contiguous two of the relay nodes 11a~11i~11nx are placed with their communication areas overlapping partially with each other. Two of the relay nodes 11a~11i~11nx interconnected with a solid arrow in FIG. 1 are contiguous to each other and operative to communicate mutually. Each of the relay nodes 11a~11i~11nx has a database DB which is constituted with memory means for storing history information and so on related to communication signals arriving thereat. (More details as to the history information and so on will be explained later.)

One or more communication terminals, such as portable telephones, personal computers or the like, are registered at each of the relay nodes 11a~11i~11nx or some of the relay nodes 11a~11i~11nx to be under the control of the same. Each of the communication terminals is discriminated with identification information of its own.

When it is intended to communicate, for example, a communication signal from a communication terminal TE1 which operates as a transmission source under the control by the relay node 11a to another communication terminal TE2 which operates as a destination under the control by the relay node 11nx, the communication signal destined for communication terminal TE2 is transmitted from the communication terminal TE1 to be received by the relay node 11a, then relayed through a communication path passing in succession, for example, the relay nodes 11b, 11e, 11f and 11i to the relay node 11nx and transferred to the communication terminal TE2. In each of the relay nodes 11a~11i~11nx, various kinds of identification information contained in the communication signal arriving thereat are processed with reference to the history information and so on preserved in the database DB in response to particular information also contained in the communication signal arriving thereat and then the communication signal is transferred to another of the relay nodes 11a~11i~11nx or the communication terminal, so that the communication signal is relayed in succession or deleted without being relayed.

Embodiment

Figure 2:
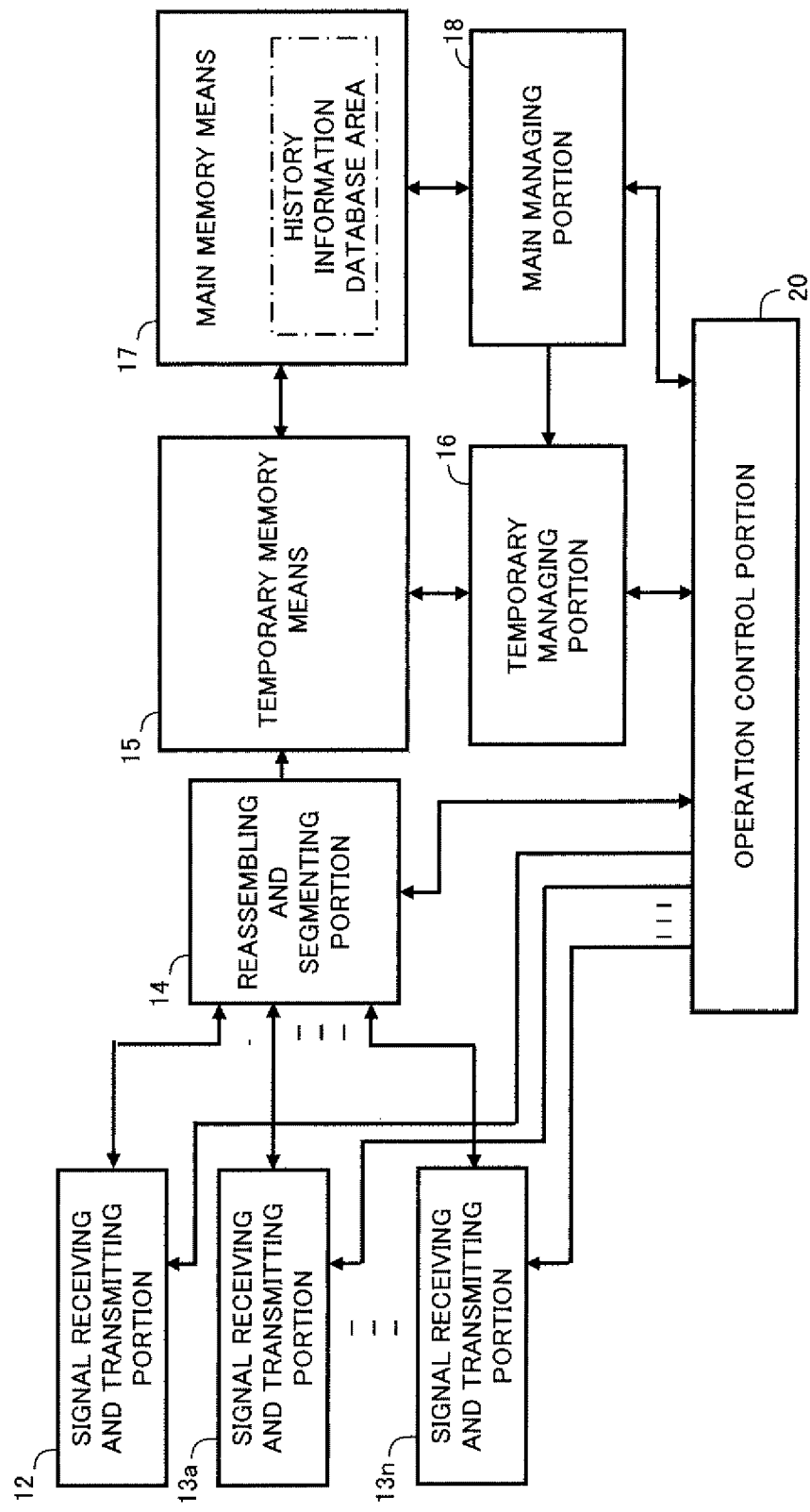
FIG. 2 is a schematic block diagram showing the embodiment of communication apparatus according to the present invention.

FIG. 2 shows an embodiment of communication apparatus according to the present invention, which can be applied to constitute each of the relay nodes 11a~11i~11nx shown in FIG. 1.

The embodiment shown in FIG. 2, which constitutes a rely node, such as one of the relay nodes 11a~11i~11nx, comprises a signal receiving and transmitting portion 12 for communication terminals and a plurality of signal receiving and transmitting portions 13a to 13n for relay nodes. The signal receiving and transmitting portion 12 is provided for communicating with communication terminals registered at the relay node constituted with the embodiment shown in FIG. 2 and operative to receive an input communication signal from one of the communication terminals and to transmit an output communication signal to the communication terminals. Each of the signal receiving and transmitting portions 13a to 13n is provided for communicating with additional relay nodes each contiguous to the relay node constituted with the embodiment shown in FIG. 2 and operative to receive an input communication signal from one of the additional relay nodes and to transmit an output communication signal to the additional relay nodes.

Each of the signal receiving and transmitting portions 12 and 13a to 13n, which receives the input communication signal, produces an input information signal based on the input communication signal received thereby and supplies a reassembling and segmenting portion 14 with the input information signal.

The reassembling and segmenting portion 14 is operative to cause the input information signal from one of the signal receiving and transmitting portions 12 and 13a to 13n to be subjected to reassembling process so as to produce framed data for storage which form a data frame containing a relay frame header segment, a frame header segment successive to the relay frame header segment and an information segment successive to the frame header segment on the basis of the input information signal from one of the signal receiving and transmitting portions 12 and 13a. In the data frame formed by the framed data for storage, various kinds of identification information, such as identification information used as mode information representing a frame mode, such as a HELO mode explained latter or SRCDST mode also explained latter, a transfer mode, and so on, identification information representing a transmission source of the input information signal supplied to the reassembling and segmenting portion 14, identification information representing a destination of the input information signal supplied to the reassembling and segmenting portion 14, identification information representing a value which decreases or increases at every transit of the input information signal through the relay node (hereinafter, referred to as a Budget), and so on, are provided in the relay frame header segment, another various kinds of identification information, such as identification information relating to the transmission source of the input information signal supplied to the reassembling and segmenting portion 14, identification information relating to the destination of the input information signal supplied to the reassembling and segmenting portion 14, identification information relating to the relay node through which the input information signal is transferred, and so on, are provided in the frame header segment, and communication information which is transferred by the input information signal supplied to the reassembling and segmenting portion 14 is provided in the information segment.

The value represented by the Budget is, for example, 1,000 at the first relay node and then decreases by a predetermined value, for example, 200, at every transit of the input communication signal through the second or subsequent relay node so as to be a positive value, zero or a negative value unless there is a particular condition. In the case of another example of the Budget, the value represented by the Budget increases by a predetermined value at every transit of the input communication signal through the second or subsequent relay node.

The reassembling and segmenting portion 14 produces the framed data for storage which form the data frame containing the relay frame header segment, the frame header segment and the information segment arranged successively in either case wherein the input information signal is supplied to the reassembling and segmenting portion 14 from the signal receiving and transmitting portion 12 or the input information signal is supplied to the reassembling and segmenting portion 14 from one of the signal receiving and transmitting portions 13a to 13n. The framed data for storage thus produced by the reassembling and segmenting portion 14 are supplied to temporary memory means 15.

Each of the signal receiving and transmitting portion 12 for communication terminals, the signal receiving and transmitting portions 13a to 13n for relay nodes and the reassembling and segmenting portion 14 operates under the control by an operation control portion 20. The temporary memory means 15 stores therein the framed data for storage under the control by a temporary managing portion 16 which is provided exclusively for the temporary memory means 15. The temporary managing portion 16 operates also under the control by the operation control portion 20.

The temporary managing portion 16 is operative to add a node header segment, which is used only in the relay node constituted with the embodiment shown in FIG. 2, to the data frame of the framed data for storage stored in the temporary memory means 15. In the node header segment, identification information representing a processing situation of the framed data for storage, such as a situation wherein the framed data for storage have not been processed yet, a situation wherein the framed data for storage are in process or a situation wherein the framed data for storage have been processed, and various kinds of other identification information, such as time information of the process to which the framed data for storage are subjected, various kinds of graphic information, and so on, are provided.

The temporary managing portion 16 is operative to scan the identification information provided in each of the node header segment, the relay frame header segment and the frame header segment contained in the data frame of the framed data for storage stored in the temporary memory means 15 in order to determine whether the identification information in the node header segment represents a situation wherein transferred communication information has been renewed or not, whether the identification information in the relay frame header segment represents a situation wherein transferred communication information should be further transferred compulsorily or is able to be deleted or not, and whether the identification information in the frame header segment represents a situation wherein communication information destined for a communication terminal belonging to the relay node constituted with the embodiment shown in FIG. 2 exists or not, and so on. Then, for example, when the identification information in the relay frame header segment represents the situation wherein the transferred communication information should be further transferred compulsorily, the temporary managing portion 16 is operative to discharge the framed data for storage stored in the temporary memory means 15 to the reassembling and segmenting portion 14 as framed data for discharge to be applied for transmission. The reassembling and segmenting portion 14 is operative to cause the framed data for discharge from the temporary memory means 15 to be subjected to segmenting process for producing an output information signal based on the framed data for discharge and to supply one of the signal receiving and transmitting portions 13a to 13n with the output information signal. The selected one of the signal receiving and transmitting portions 13a to 13n to which the output information signal is supplied is operative to produce an output communication signal based on the output information signal and then transmit the output communication signal to other relay nodes each contiguous to the relay node constituted with the embodiment shown in FIG. 2. Thereby, the data frame of the framed data for discharge is relayed compulsorily.

In such a case as mentioned above, each of the reassembling and segmenting portion 14 and the selected one of the signal receiving and transmitting portions 13a to 13n operates also under the control by the operation control portion 20.

Further, for example, when the identification information in the relay frame header segment does not represent the situation wherein the transferred communication information should be further transferred compulsorily nor the situation wherein the transferred communication information is able to be deleted, the temporary managing portion 16 is operative to read the identification information in each of the relay frame header segment and the frame header segment contained in the data frame of the framed data for storage from the temporary memory means 15 to be stored in main memory means 17. Therefore, the identification information provided in each of the relay frame header segment and the frame header segment is stored in the main memory means 17. The main memory means 17 stores therein the identification information provided in each of the relay frame header segment and the frame header segment under the control by a main managing portion 18 which is provided exclusively for the main memory means 17. The main managing portion 18 operates also under the control by the operation control portion 20.

The temporary managing portion 16 is further operative to provide the node header segment remaining in the temporary memory means 15 with identification information representing a state of waiting for a judgment by the main managing portion 18.

The main managing portion 18 is operative to cause the identification information in each of the relay frame header segment and the frame header segment stored in the main memory means 17 to be preserved as arranged history information in a history information database area which is provided in the main memory means 17. Therefore, in the history information database area which is provided in the main memory means 17, a history information database wherein the identification information in each of the relay frame header segment and the frame header segment which had been stored in the main memory means in the past has been preserved as the history information is constituted as a part of the database DB shown in FIG. 1.

The main managing portion 18 is further operative to compare the identification information in each of the relay frame header segment and the frame header segment stored newly in the main memory means 17 with the history information preserved in the history information database area which is provided in the main memory means 17 to have the result of the comparison. Then, the main managing portion 18 decides, on the basis of the result of the comparison, for example, whether a transmission source of the input information signal, from which the identification information in each of the relay frame header segment and the frame header segment has been obtained, is a communication terminal belonging to the relay node constituted with the embodiment shown in FIG. 2 or not, whether a destination of the input information signal, from which the identification information in each of the relay frame header segment and the frame header segment has been obtained, is a communication terminal belonging to the relay node constituted with the embodiment shown in FIG. 2 or not, whether the input information signal, from which the identification information in each of the relay frame header segment and the frame header segment has been obtained, has previously arrived at the relay node constituted with the embodiment shown in FIG. 2 or not, and so on, to make judgments of the input information signal.

Further, the identification information in each of the relay frame header segment and the frame header segment stored in the main memory means 17 is subjected, as occasion demands, by the main managing portion 18, to modifying process by which the identification information in each of the relay frame header segment and the frame header segment is modified, as occasion demands, in response to the judgments of the input information signal, or added, as occasion demands, a flag responding to the judgments of the input information signal. The value represented by the Budget which is contained in the identification information in the relay frame header segment is reduced by, for example, 200 in the modifying process. Then, the identification information in each of the relay frame header segment and the frame header segment having been subjected, as occasion demands, to the modifying process, is discharged as processed identification information from the main memory means 17 to the temporary memory means 15 by the main managing portion 18.

That is, the main memory means 17 stores the identification information provided in the data frame of the framed data for storage stored in and then read from the temporary memory means 15 so as to preserve the same as the arranged history information in the history information database area and then discharges the identification information stored therein or the identification information having been subjected to the modifying process to the temporary memory means 15 as the processed identification information, under the control by the main managing portion 18. As a result, the processed identification information is transferred from the main memory means 17 to the temporary memory means 15.

When the processed identification information has been transferred from the main memory means 17 to the temporary memory means 15, the temporary managing portion 16 is operative to provide the relay frame header segment and the frame header segment, which are contained, in addition to the node header segment wherein the identification information representing the state of waiting for the judgment by the main managing portion 18 is provided, in the data frame of the framed data for storage stored in the temporary memory means 15, with the processed identification information transferred thereto. Thereby, framed data for discharge which form a data frame containing the node header segment, the relay frame header segment and the frame header segment, in both of which the processed identification information is provided, and the information segment in which the communication information is provided, are produced. The temporary managing portion 16 is operative, as occasion demands, to put the framed data for discharge thus produced in a condition wherein the node header segment of the framed data for discharge is deleted so that the framed data for discharge form the data frame containing the relay frame header segment, the frame header segment and the information segment, and the framed data for discharge without the node header segment are discharged from the temporary memory means 15 to the reassembling and segmenting portion 14 to be subjected to transmitting process or deleted without being discharged to the reassembling and segmenting portion 14.

That is, the temporary memory means 15 is operative, under the control by the temporary managing portion 16, to store temporarily the framed data for storage from the reassembling and segmenting portion 14 and further to store temporarily the framed data for discharge which form the data frame containing the relay frame header segment and the frame header segment, in both of which the processed identification information is provided, and the information segment in which the communication information is provided, and then, as occasion demands, to discharge the framed data for discharge to the reassembling and segmenting portion 14 to be subjected to the transmitting process or delete the framed data for discharge without discharging the same to the reassembling and segmenting portion 14.

The reassembling and segmenting portion 14 is operative to cause the framed data for discharge from the temporary memory means 15 to be subjected to segmenting process for producing an output information signal based on the framed data for discharge and to supply one of the signal receiving and transmitting portions 12 and 13a to 13n with the output information signal in response to the processed identification information contained in the data frame of the framed data for discharge. The selected one of the signal receiving and transmitting portions 12 and 13a to 13n to which the output information signal is supplied is operative to produce an output communication signal based on the output information signal and then transmit the output communication signal to a communication terminal belonging to the relay node constituted with the embodiment shown in FIG. 2 or other relay nodes each contiguous to the relay node constituted with the embodiment shown in FIG. 2. Thereby, the data frame of the framed data for discharge is transferred to the communication terminal or relayed to the relay nodes each contiguous to the relay node constituted with the embodiment shown in FIG. 2.

As described above, in the relay node constituted with the embodiment shown in FIG. 2 to be provided for relaying the communication information in the wireless mesh network, the operation control portion 20 which controls the temporary managing portion 16 and the main managing portion 18 causes the temporary managing portion 16 and the main managing portion 18 to carry out the below-mentioned operations, in addition to the control operations for storing temporarily the framed data for storage and the framed data for discharge in the temporary memory means 15 and the control operations for storing and preserving the identification information in the main memory means 17 and discharging the processed identification information from the main memory means 17. That is, the temporary managing portion 16 and the main managing portion 18 carry out the following operations under the control by the operation control portion 20.

In the relay node constituted with the embodiment shown in FIG. 2, a data frame formed with the framed data for storage obtained from the reassembling and segmenting portion 14 on the basis of an input communication signal arriving thereat is generally set to be of a frame mode named an existing information delivering mode (hereinafter, referred to as an HELO mode) or of another frame mode named an adversary searching mode (hereinafter, referred to as a SRCDST mode). The reason for this is that a communication terminal which operates as a transmission source of the input communication signal arriving at the relay node constituted with the embodiment shown in FIG. 2 is operative, on the occasion of communication, first to transmit a data frame of the HELO mode in order to cause the wireless network with which the communication terminal is concerned to notice the existence of the communication terminal and then to transmit a data frame of the SRCDST mode for delivering communication information through the wireless mesh network to another communication terminal which operates as a destination.

The data frame of the HELO mode contains, for example, a relay frame header segment, a frame header segment successive to the relay frame header segment and an information segment successive to the frame header segment, as shown in FIG. 3A. In the example of data frame of the HELO mode shown in FIG. 3A, no communication information is provided in the information segment contained in the data frame of the HELO mode, so that the information segment contained in the data frame of the HELO mode is empty. Another example of the data frame of the HELO mode dose not contain any information segment. Various kinds of identification information, such as identification information representing the frame mode (hereinafter, referred to as an FM information), identification information representing a transmission source of the data frame (hereinafter, referred to as a transmission source ID), identification information representing the Budget (hereinafter, referred to as a BD) and other information, are provided in the relay frame header segment, as shown in FIG. 3B. In the relay frame header segment shown in FIG. 3B, the FM information is constituted with 2-bit data: "0 0" representing the HELO mode, the transmission source ID represents a situation wherein the transmission source is the communication terminal TE1 and the BD represents a situation wherein the Budget at the communication terminal TE1 provided as the transmission source is 1000.

The temporary managing portion 16 and the main managing portion 18 are operative to detect the data frame of the HELO mode formed with the framed data for storage obtained from the reassembling and segmenting portion 14 and to cause the detected data frame of the HELO mode to be stored temporary in the temporary memory means 15, and then operative also to cause the various kinds of identification information provided in the relay header segment as shown in FIG. 3C to be stored in the main memory means 17 and to cause the transmission source ID and the BD to be preserved as history information in the history information database area which is provided in the main memory means 17. After that, when information communication destined to the communication terminal represented by the transmission source ID is carried out, the transmission source ID and the BD preserved as history information in the history information database area are used as a Budget related to the destination, that is, the communication terminal represented by the transmission source ID, with which the Budget represented by the BD corresponds to a distance to the destination.

Then, the temporary managing portion 16 and the main managing portion 18 are further operative to change the BD stored in the main memory means 17, which represents the Budget of 1000, by means of reducing the Budget of 1000 represented by the BD to be 800. The various kinds of identification information including the BD having been changed to represent the Budget of 800 are discharged as processed identification information from the main memory means 17 to the temporary memory means 15.

In the temporary memory means 15, a data frame of the HELO mode containing processed header segments constituted with the relay frame header segment and the frame header segment, wherein the BD representing the Budget of 800 is provided, is formed, as shown in FIGS. 3D and 3E, and framed data for discharge forming the data frame of the HELO mode are obtained. The temporary managing portion 16 and the main managing portion 18 is operative to discharge the framed data for discharge forming the data frame of the HELO mode from the temporary memory means 15 to the reassembling and segmenting portion 14. As a result, an output communication signal produced based on the data frame containing the relay frame header segment wherein the BD representing the Budget of 800 is provided is transmitted from one of the signal receiving and transmitting portions 13a to 13n. Thereby, the data frame containing the relay frame header segment wherein the BD representing the Budget of 800 is relayed in the wireless mesh network.

In the data frame of the HELO mode transmitted from the transmission source, first the Budget is, for example, 1000 and then the Budget decreases, for example, by 200 at every relay of the data frame of the HELO mode at the relay node. The temporary managing portion 16 and the main managing portion 18 operating under the control by the operation control portion 20 is operative to cause the data frame of the HELO mode to be deleted without being relayed when the BD provided in the processed header segments contained in the data frame of the HELO mode formed in the temporary memory means 15 represents the Budget of zero or a negative value.

Accordingly, the data frame of the HELO mode has the Budget of, for example, 1000 at the transmission source and then the Budget decreasing, for example, by 200 at every relay thereof at the relay node toward zero or the negative value and is deleted without being relayed when the Budget reaches zero or the negative value. That is, the data frame of the HELO mode having the Budget of 1000 at the transmission source is relayed four times to have the Budget of 200 and then deleted without being relayed five times. In the relay node constituted with the embodiment shown in FIG. 2 which has relayed the data frame of the HEL0 mode, the transmission source ID and the BD provided in the relay frame header segment contained in the data frame of the HELO mode are preserved as the history information in the history information database area which is provided in the main memory means 17.

In such a manner as described above, the transmission source ID and the BD provided in the relay frame header segment contained in the data frame of the HELO mode formed with the framed data for storage which was detected in the past are preserved as the history information in the history information database area provided in the main memory means 17.

On the other hand, the data frame of the SRCDST mode contains, for example, a relay frame header segment wherein identification information representing a transfer mode (hereinafter, referred to as a TM information), identification information representing a designation of the data frame (hereinafter, referred to as a destination ID), a destination BD representing the Budget at the destination, identification information representing a transmission source of the data frame (a transmission source ID), identification information representing the Budget (a BD) and other information are provided, a frame header segment successive to the relay frame header segment, and an information segment successive to the frame header segment, as shown in FIGS. 4A and 4B.

The transfer mode represented by the TM information is one of a diffusion transfer mode, a percolation transfer mode and a convergence transfer mode. The TM information represents the diffusion transfer mode with 2-bit data "1 1", the percolation transfer mode with 2-bit data "1 0" and the convergence transfer mode with 2-bit data "0 1". In the diffusion transfer mode, the data frame of the SRCDST containing the relay frame header segment wherein the TM information representing the diffusion transfer mode is provided is identical with the data frame transmitted from the transmission source or a data frame transmitted diffusively. In the percolation transfer mode, the data frame of the SRCDST containing the relay frame header segment wherein the TM information representing the percolation transfer mode is provided is identical with a data frame transmitted at a predetermined probability. In the convergence transfer mode, the data frame of the SRCDST mode containing the relay frame header segment wherein the TM information representing the convergence transfer mode is provided is identical with a data frame transmitted convergently toward a destination thereof. The data frame transmitted at the predetermined probability is possibly deleted without being transmitted.

The BD represents the Budget which is, for example, 1,000 at the transmission source of the data frame of the SRCDST mode and decreases, for example, by 200 at every relay of the data frame of the SRCDST mode at the relay node, in the same manner as the aforementioned BD in the data frame of the HELO mode.

In the example of the relay frame header segment shown in FIG. 4B, the TM information is constituted with 2-bit data: "1 1" representing the diffusion transfer mode, the destination ID represents a situation wherein the destination is the communication terminal TE2, the destination BD represent a situation wherein the Budget at the destination is unknown, the transmission source ID represents a situation wherein the transmission source is the communication terminal TE1 and the BD represents the Budget of 1000.

Figure 5:
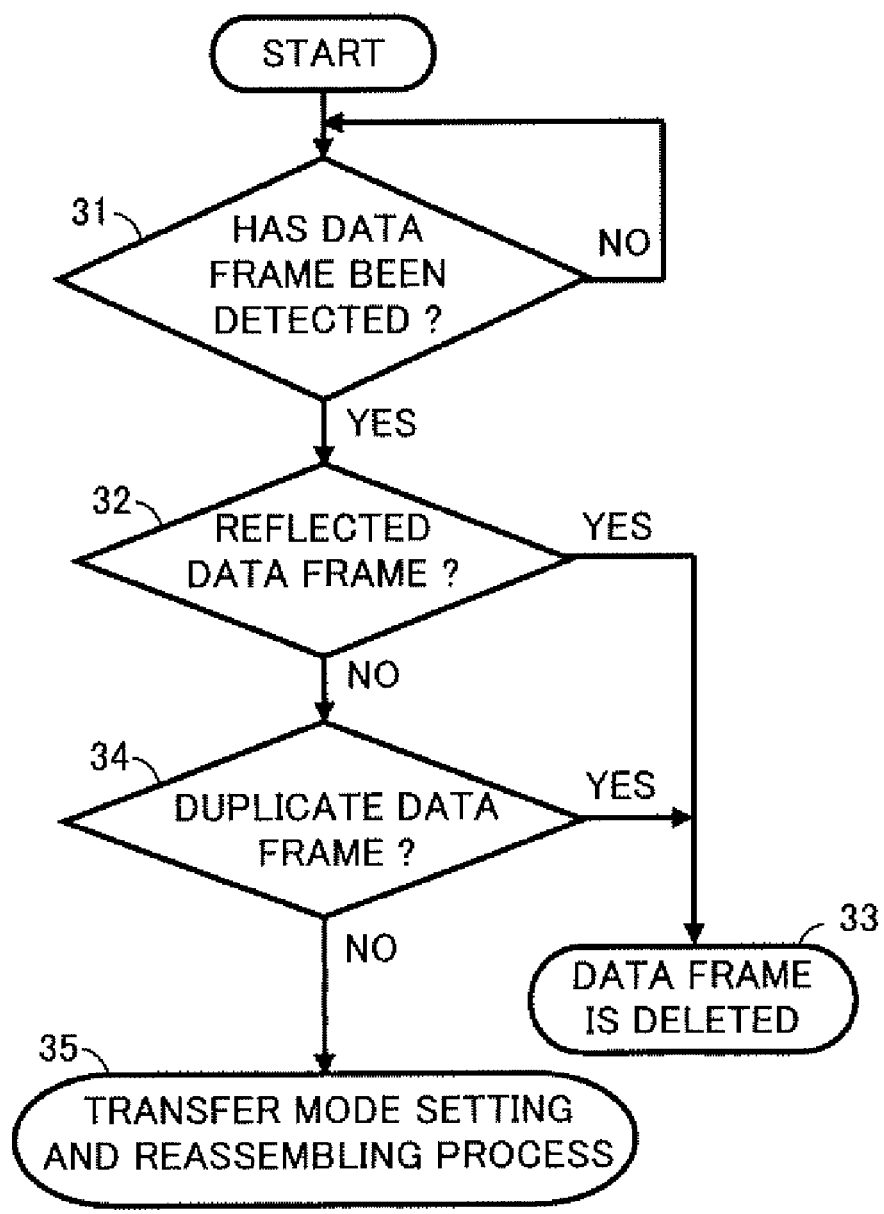
FIG. 5 is a flow chart used for explaining control operations which a temporary managing portion and a main managing portion carry out under the control by an operation control portion in the embodiment shown in FIG. 2.
Figure 6:
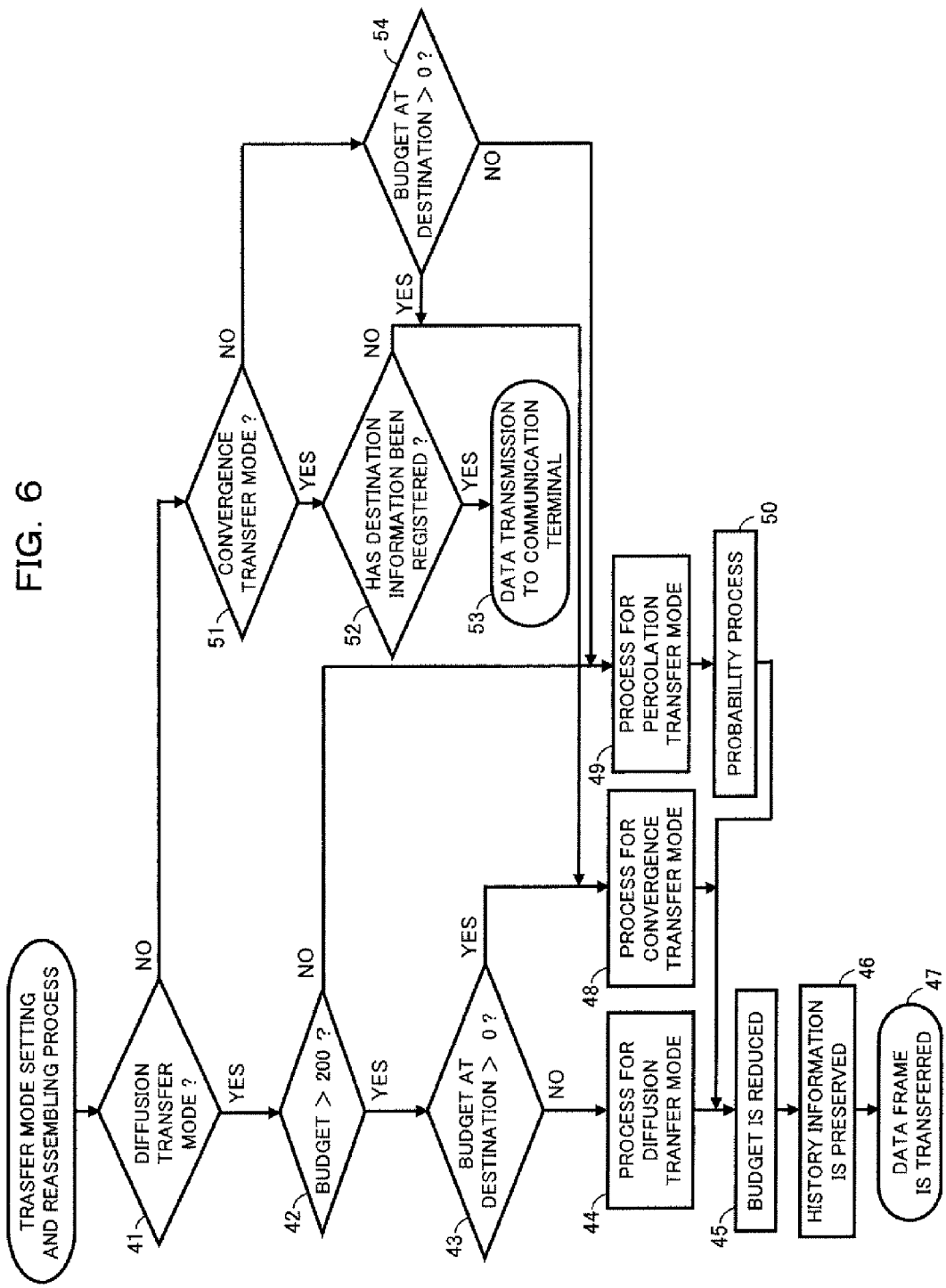
FIG. 6 is a flow chart used for explaining control operations which a temporary managing portion and a main managing portion carry out under the control by an operation control portion in the embodiment shown in FIG. 2.

Under such a condition, the control operations carried out by the temporary managing portion 16 and the main managing portion 18 under the control by the operation control portion 20 for the data frame of the SRCDST mode containing the relay frame header segment wherein the TM information representing one of the diffusion transfer mode, the percolation transfer mode and the convergence transfer mode is provided, will be explained below in conjunction with flow charts shown in FIGS. 5 and 6.

With the control by the temporary managing portion 16 and the main managing portion 18, it is checked whether the data frame of the SRCDST mode containing the relay frame header segment wherein the TM information representing one of the diffusion transfer mode, the percolation transfer mode and the convergence transfer mode is provided is detected or not. (Step 31 shown in FIG. 5) When the data frame of the SRCDST mode has been detected, the detected data frame of the SRCDST mode is temporarily stored in the temporary memory means 15 and then the various kinds of identification information provided in the relay frame header segment in the data frame of the SRCDST mode, as shown in FIGS. 4B and 4C, are stored in the main memory means 17. In the main memory means 17, the destination ID, the destination BD, the transmission source ID and the BD are preserved as the history information in the history information database area. Then, it is checked whether the data frame of the SRCDST mode stored temporarily in the temporary memory means 15 is a reflected frame or not. (Step 32 shown in FIG. 5)

If the data frame of the SRCDST mode stored temporarily in the temporary memory means 15 is the same as a data frame of the SRCDST mode relayed through the relay node constituted with the embodiment shown in FIG. 2 just before the new storage of the data frame of the SRCDST mode in the temporary memory means 15, the data frame of the SRCDST mode stored temporarily in the temporary memory means 15 is the reflected frame, and if the data frame of the SRCDST mode stored temporarily in the temporary memory means 15 is not the same as the data frame of the SRCDST mode relayed through the relay node constituted with the embodiment shown in FIG. 2 just before the new storage of the data frame of the SRCDST mode in the temporary memory means 15, the data frame of the SRCDST mode stored temporarily in the temporary memory means 15 is not the reflected frame. For checking whether the data frame of the SRCDST mode stored temporarily in the temporary memory means 15 is the same as the data frame of the SRCDST mode relayed through the relay node constituted with the embodiment shown in FIG. 2 just before the new storage of the data frame of the SRCDST mode in the temporary memory means 15 or not, the various kinds of identification information provided in the relay frame header segment in the data frame of the SRCDST mode stored temporarily in the temporary memory means 15 are compared with various kinds of identification information provided in the relay frame header segment in the data frame of the SRCDST mode relayed just before the new storage of the data frame of the SRCDST mode in the temporary memory means 15, which are preserved in the historical information database area provided in the main memory means 17. If the various kinds of identification information provided in the relay frame header segment in the data frame of the SRCDST mode stored temporarily in the temporary memory means 15 are identical with the various kinds of identification information provided in the relay frame header segment in the data frame of the SRCDST mode relayed just before the new storage of the data frame of the SRCDST mode in the temporary memory means 15 as a result of the comparison, the data frame of the SRCDST mode stored temporarily in the temporary memory means 15 is the same as the data frame of the SRCDST mode relayed through the relay node constituted with the embodiment shown in FIG. 2 just before the new storage of the data frame of the SRCDST mode in the temporary memory means 15.

When the data frame of the SRCDST mode stored temporarily in the temporary memory means 15 is the reflected frame, the data frame of the SRCDST mode stored temporarily in the temporary memory means 15 is deleted without being relayed. (Step 33 shown in FIG. 5) On the other hand, when the data frame of the SRCDST mode stored temporarily in the temporary memory means 15 is not the reflected frame, it is checked whether the data frame of the SRCDST mode stored temporarily in the temporary memory means 15 is a duplicate frame or not. (Step 34 shown in FIG. 5)

If the data frame of the SRCDST mode stored temporarily in the temporary memory means 15 is the same as a data frame of the SRCDST mode relayed through the relay node constituted with the embodiment shown in FIG. 2 in the past, the data frame of the SRCDST mode stored temporarily in the temporary memory means 15 is the duplicate frame, and if the data frame of the SRCDST mode stored temporarily in the temporary memory means 15 is not the same as the data frame of the SRCDST mode relayed through the relay node constituted with the embodiment shown in FIG. 2 in the past, the data frame of the SRCDST mode stored temporarily in the temporary memory means 15 is not the duplicate frame. For checking whether the data frame of the SRCDST mode stored temporarily in the temporary memory means 15 is the same as a data frame of the SRCDST mode relayed through the relay node constituted with the embodiment shown in FIG. 2 in the past, the various kinds of identification information provided in the relay frame header segment in the data frame of the SRCDST mode stored temporarily in the temporary memory means 15 are compared with various kinds of identification information provided in the relay frame header segment in the data frame of the SRCDST mode relayed in the past, which are preserved in the history information database area provided in the main memory means 17. If the various kinds of identification information provided in the relay frame header segment in the data frame of the SRCDST mode stored temporarily in the temporary memory means 15 are identical with the various kinds of identification information provided in the relay frame header segment in the data frame of the SRCDST mode relayed in the past, the data frame of the SRCDST mode stored temporarily in the temporary memory means 15 is the same as the data frame of the SRCDST mode relayed through the relay node constituted with the embodiment shown in FIG. 2 in the past.

When the data frame of the SRCDST mode stored temporarily in the temporary memory means 15 is the duplicate frame, the data frame of the SRCDST mode stored temporarily in the temporary memory means 15 is deleted without being relayed. (Step 33 shown in FIG. 5) On the other hand, when the data frame of the SRCDST mode stored temporarily in the temporary memory means 15 is not the duplicate frame, the data frame of the SRCDST mode stored temporarily in the temporary memory means 15 is subjected to transfer mode setting and reassembling process. (Step 35 shown in FIG. 5)

In the transfer mode setting and reassembling process, it is checked whether the TM information provided in the relay frame header segment in the data frame of the SRCDST mode stored temporarily in the temporary memory means 15 represents the diffusion transfer mode or not. (Step 41 shown in FIG. 6) When the TM information provided in the relay frame header segment in data frame of the SRCDST mode stored temporarily in the temporary memory means 15 is constituted with 2-bit data: "1 1" representing the diffusion transfer mode, as shown in FIG. 4B, it is checked whether the Budget represented by the BD provided in the relay frame header segment in data frame of the SRCDST mode stored temporarily in the temporary memory means 15 is larger than a predetermined value, for example, 200. (Step 42 shown in FIG. 6)

When the Budget represented by the BD provided in the relay frame header segment in data frame of the SRCDST mode stored temporarily in the temporary memory means 15 is larger than 200, such as 1000, as shown in FIG. 4B, it is checked whether the Budget at the destination represented by the destination ID provided in the relay frame header segment in data frame of the SRCDST mode stored temporarily in the temporary memory means 15, which is preserved in the history information database area provided in the main memory means 17, is larger than zero or not. (Step 43 shown in FIG. 6)

When the Budget at the destination represented by the destination ID provided in the relay frame header segment in the data frame of the SRCDST mode stored temporarily in the temporary memory means 15, which is preserved in the history information database area provided in the main memory means 17, is nonexistent or not larger than zero, the transfer mode of the data frame of the SRCDST mode stored temporarily in the temporary memory means 15 is set to be the diffusion transfer mode and the TM information provided in the relay frame header segment in data frame of the SRCDST mode stored temporarily in the temporary memory means 15 is maintained without change to be constituted with 2-bit data: "1 1" representing the diffusion transfer mode. (Step 44 shown in FIG. 6)

In addition, the Budget represented by the BD provided in the relay frame header segment in the data frame of the SRCDST mode stored temporarily in the temporary memory means 15 is reduced by 200. That is, when the Budget represented by the BD is 1000, as shown in the relay frame header segment in FIG. 4B, the Budget represented by the BD is reduced to be 800. (Step 45 shown in FIG. 6)

Figure 7:
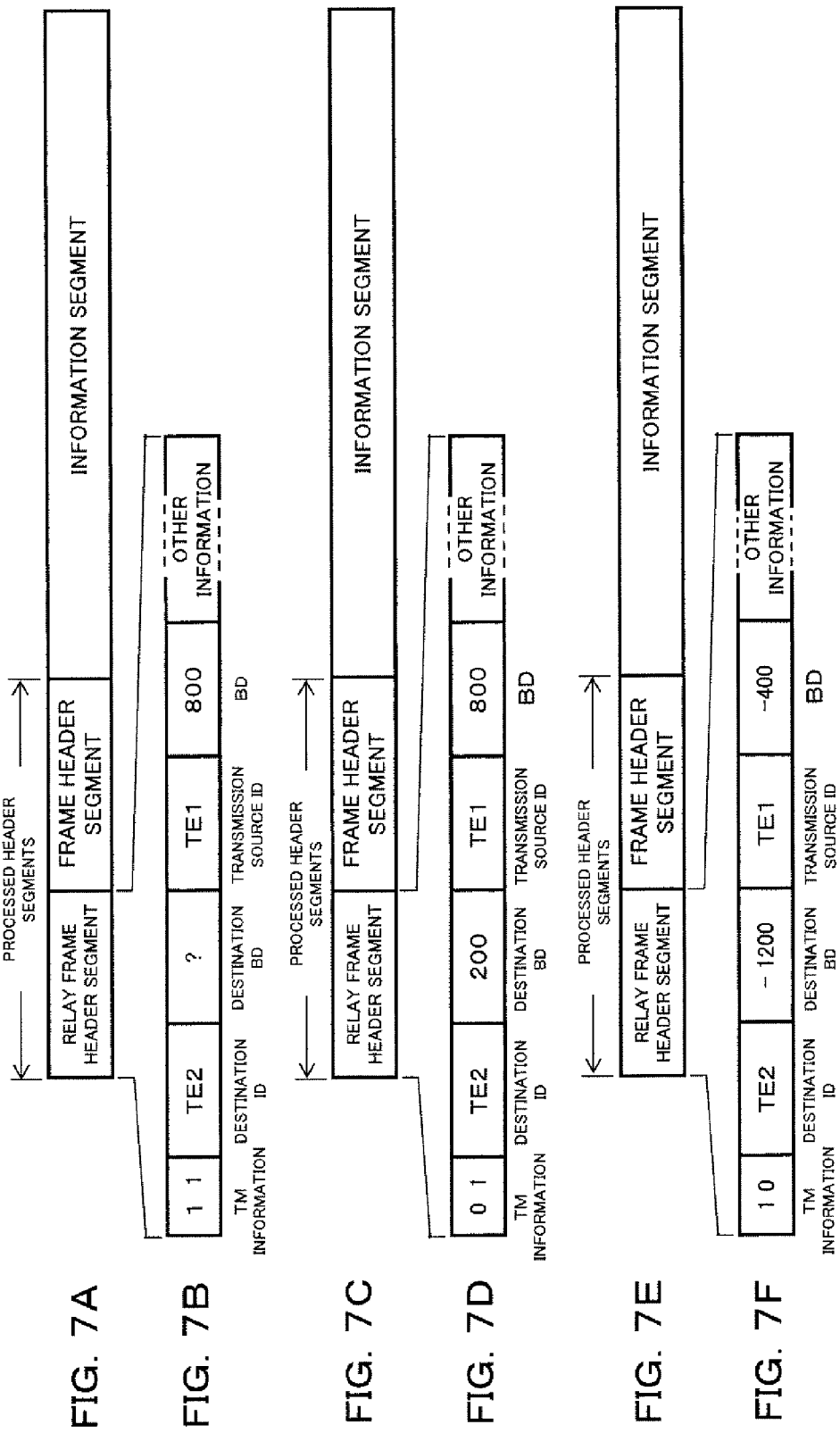
FIGS. 7A to 7F are schematic illustrations showing examples of data formats each representing an allocation of framed data or a part of the framed data obtained in the embodiment shown in FIG. 2.

Thereby, the data frame of the SRCDST mode stored temporarily in the temporary memory means 15 is modified to contain a relay frame header segment wherein the TM information constituted with 2-bit data: "1 1" representing the diffusion transfer mode, the destination ID representing the situation wherein the destination is the communication terminal TE2, the destination BD representing the situation wherein the Budget at the destination is unknown, the transmission source ID representing the situation wherein the transmission source is the communication terminal TE1, the BD representing the Budget of 800 and other information are provided, the frame header segment successive to the relay frame header segment, and the information segment successive to the frame header segment, as shown in FIGS. 7A and 7B. The relay frame header segment and the frame header segment in the data frame of the SRCDST mode thus modified constitute processed header segments, as shown in FIG. 7A. Then, in the temporary memory means 15, framed data for discharge which form the data frame of the SRCDST mode modified to contain the processed header segments and the information segment are obtained.

The destination ID representing the situation wherein the destination is the communication terminal TE2, the destination BD representing the situation wherein the Budget at the destination is unknown, the transmission source ID representing the situation wherein the transmission source is the communication terminal TE1 and the BD representing the Budget of 800 provided in the relay frame header segments in the data frame of the SRCDST mode which is formed by the framed data for discharge obtained in the temporary memory means 15 are preserved in the history information database area provided in the main memory means 17. (Step 46 shown in FIG. 6)

Then, the framed data for discharge which form the data frame of the SRCDST mode modified to contain the processed header segments and the information segment and are obtained in the temporary memory means 15 are discharged from the temporary memory means 15 to the reassembling and segmenting portion 14. Thereby, an output communication signal produced based on the data frame of the SRCDST mode containing the processed header segments constituted with the relay frame header segment wherein the TM information constituted with 2-bit data: "1 1" representing the diffusion transfer mode, the destination ID representing the situation wherein the destination is the communication terminal TE2, the destination BD representing the situation wherein the Budget at the destination is unknown, the transmission source ID representing the situation wherein the transmission source is the communication terminal TE1, the BD representing the Budget of 800 and other information are provided and the frame header segment, together with the information segment, is transmitted from one of the signal receiving and transmitting portions 13a to 13n, so that the data frame of the SRCDST mode containing the relay frame header segment wherein the TM information constituted with 2-bit data: "1 1" representing the diffusion transfer mode and other identification information are provided, the frame header segment and the information segment is diffusively transmitted to be relayed through the relay node constituted with the embodiment shown in FIG. 2. (Step 47 shown in FIG. 6)

When the Budget at the destination represented by the destination ID provided in the relay frame header segment in the data frame of the SRCDST mode stored temporarily in the temporary memory means 15, which is preserved in the history information database area provided in the main memory means 17, is existent and larger than zero, for example, 200, as a result of the aforementioned check (Step 43 shown in FIG. 6), the transfer mode of the data frame of the SRCDST mode stored temporarily in the temporary memory means 15 is set to be the convergence transfer mode and the TM information provided in the relay frame header segment in data frame of the SRCDST mode stored temporarily in the temporary memory means 15, which is constituted with 2-bit data: "1 1" representing the diffusion transfer mode, is changed to be constituted with 2-bit data: "0 1" representing the convergence transfer mode. (Step 48 shown in FIG. 6) Next, the destination BD provided in the relay frame header segment in the data frame of the SRCDST mode stored temporarily in the temporary memory means 15 is set to represent the Budget of 200 at the destination. In addition, the Budget represented by the BD provided in the relay frame header segment in the data frame of the SRCDST mode stored temporarily in the temporary memory means 15 is reduced by 200. That is, when the Budget represented by the BD is 1000, as shown in the relay frame header segment in FIG. 4B, the Budget represented by the BD is reduced to be 800. (Step 45 shown in FIG. 6)

Thereby, the data frame of the SRCDST mode stored temporarily in the temporary memory means 15 is modified to contain a relay frame header segment wherein the TM information constituted with 2-bit data: "0 1" representing the convergence transfer mode, the destination ID representing the situation wherein the destination is the communication terminal TE2, the destination BD representing the Budget of 200 at the destination, the transmission source ID representing the situation wherein the transmission source is the communication terminal TE1, the BD representing the Budget of 800 and other information are provided, the frame header segment successive to the relay frame header segment, and the information segment successive to the frame header segment, as shown in FIGS. 7C and 7D. The relay frame header segment and the frame header segment in the data frame of the SRCDST mode thus modified constitute processed header segments, as shown in FIG. 7C. Then, in the temporary memory means 15, framed data for discharge which form the data frame of the SRCDST mode modified to contain the processed header segments and the information segment are obtained.

The destination ID representing the situation wherein the destination is the communication terminal TE2, the destination BD representing the Budget of 200 at the destination, the transmission source ID representing the situation wherein the transmission source is the communication terminal TE1 and the BD representing the Budget of 800 provided in the relay frame header segments in the data frame of the SRCDST mode which is formed by the framed data for discharge obtained in the temporary memory means 15 are preserved in the history information database area provided in the main memory means 17. (Step 46 shown in FIG. 6)

Then, the framed data for discharge which form the data frame of the SRCDST mode modified to contain the processed header segments and the information segment and are obtained in the temporary memory means 15 are discharged from the temporary memory means 15 to the reassembling and segmenting portion 14. Thereby, an output communication signal produced based on the data frame of the SRCDST mode containing the processed header segments constituted with the relay frame header segment wherein the TM information constituted with 2-bit data: "0 1" representing the convergence transfer mode, the destination ID representing the situation wherein the destination is the communication terminal TE2, the destination BD representing the Budget of 200 at the destination, the transmission source ID representing the situation wherein the transmission source is the communication terminal TE1, the BD representing the Budget of 800 and other information are provided and the frame header segment, together with the information segment, is transmitted from one of the signal receiving and transmitting portions 13a to 13n, so that the data frame of the SRCDST mode containing the relay frame header segment wherein the TM information constituted with 2-bit data: "0 1" representing the convergence transfer mode and other identification information are provided, the frame header segment and the information segment is convergently transmitted toward the destination to be relayed through the relay node constituted with the embodiment shown in FIG. 2. (Step 47 shown in FIG. 6)

When the Budget at the destination represented by the destination ID provided in the relay frame header segment in the data frame of the SRCDST mode stored temporarily in the temporary memory means 15, which is preserved in the history information database area provided in the main memory means 17, is not larger than 200, as a result of the aforementioned check (Step 42 shown in FIG. 6), the transfer mode of the data frame of the SRCDST mode stored temporarily in the temporary memory means 15 is set to be the percolation transfer mode and the TM information provided in the relay frame header segment in data frame of the SRCDST mode stored temporarily in the temporary memory means 15, which is constituted with 2-bit data: "1 1" representing the diffusion transfer mode, is changed to be constituted with 2-bit data: "1 0" representing the percolation transfer mode. (Step 49 shown in FIG. 6)

Next, the data frame of the SRCDST mode containing the relay frame header segment wherein the TM information constituted with 2-bit data: "1 0" representing the percolation transfer mode and other identification information are provided, the frame header segment and the information segment is subjected to probability process, with which the data frame of the SRCDST mode containing the relay frame header segment wherein the TM information constituted with 2-bit data: "1 0" representing the percolation transfer mode and other identification information are provided, the frame header segment and the information segment is controlled to be discharged at a predetermined probability from the temporary memory means 15 to the reassembling and segmenting portion 14 or deleted without being discharged. (Step 50 shown in FIG. 6)

In the probability process, the Budget represented by the destination BD provided in the relay frame header segment in the data frame of the SRCDST mode (hereinafter, referred to as a header destination Budget) and a Budget at the communication terminal TE2 provided as the destination represented by the destination ID provided in the relay frame header segment in the data frame of the SRCDST mode, which has been preserved in the history information database area provided in main memory means 17 (hereinafter, referred to as a preserved destination Budget), are compared with each other to produce a result of comparison and it is judged on the strength of the result of comparison whether the data frame of the SRCDST mode is on the way going up to the communication terminal TE2 provided as the destination, on the way going away from the communication terminal TE2 provided as the destination or neither on the way going up to the communication terminal TE2 provided as the destination nor on the way going away from the communication terminal TE2 provided as the destination.

If the absolute value of the header destination Budget is larger than the absolute value of the preserved destination Budget, it is judged that the data frame of the SRCDST mode is on the way going up to the communication terminal TE2 provided as the destination. If the absolute value of the header destination Budget is smaller than the absolute value of the preserved destination Budget, it is judged that the data frame of the SRCDST mode is on the way going away from the communication terminal TE2 provided as the destination. If the absolute value of the header destination Budget is equal to the absolute value of the preserved destination Budget, it is judged that the data frame of the SRCDST mode is neither on the way going away from the communication terminal TE2 provided as the destination nor on the way going away from the communication terminal TE2 provided as the destination.

When the data frame of the SRCDST mode is on the way going up to the communication terminal TE2 provided as the destination, relay probability (transfer probability or percolation probability) of the data frame of the SRCDST mode is set to be, for example, double as large as a predetermined standard probability of $1/3$, that is, $2/3$. When the data frame of the SRCDST mode is on the way going away from the communication terminal TE2 provided as the destination, the relay probability (the transfer probability or the percolation probability) of the data frame of the SRCDST mode is set to be, for example, a half of the predetermined standard probability of $1/3$, that is, $1/6$. When the data frame of the SRCDST mode is neither on the way going away from the communication terminal TE2 provided as the destination nor on the way going away from the communication terminal TE2 provided as the destination, the relay probability (the transfer probability or the percolation probability) of the data frame of the SRCDST mode is set to be, for example, the predetermined standard probability of $1/3$.

When no preserved destination Budget has been preserved in the history information database area provided in the main memory means 17 and therefore the header destination Budget and the preserved destination Budget can not be compared with each other, the relay probability (the transfer probability or the percolation probability) of the data frame of the SRCDST mode is set to be, for example, 1 (100 percents).

With the relay probability (the transfer probability or the percolation probability) thus set for the data frame of the SRCDST mode which has been subjected to the probability process, the data frame of the SRCDST mode which has been subjected to the probability process is set to be discharged from the temporary memory means 15 to the reassembling and segmenting portion 14 in the form of framed data for discharge or to be deleted.

The destination BD provided in the relay frame header segment in the data frame of the SRCDST mode which is set to be discharged from the temporary memory means 15 to the reassembling and segmenting portion 14 in the form of the framed data for discharge with the aforementioned relay probability (the transfer probability or the percolation probability) is set to represent the preserved destination Budget. Then, the Budget represented by the BD provided in the relay frame header segment in the data frame of the SRCDST mode which is set to be discharged from the temporary memory means 15 to the reassembling and segmenting portion 14 in the form of the framed data for discharge with the aforementioned relay probability (the transfer probability or the percolation probability) is reduced by 200. (Step 45 shown in FIG. 6)

Thereby, the data frame of the SRCDST mode which is set to be discharged from the temporary memory means 15 to the reassembling and segmenting portion 14 in the form of the framed data for discharge with the aforementioned relay probability (the transfer probability or the percolation probability), is modified to contain a relay frame header segment wherein the TM information constituted with 2-bit data: "1 0" representing the percolation transfer mode, the destination ID representing the situation wherein the destination is the communication terminal TE2, the destination BD representing the Budget of, for example, −1200 at the destination, the transmission source ID representing the situation wherein the transmission source is the communication terminal TE1, the BD representing the Budget of, for example, −400 and other information are provided, the frame header segment successive to the relay frame header segment, and the information segment successive to the frame header segment, as shown in FIGS. 7E and 7F. The relay frame header segment and the frame header segment in the data frame of the SRCDST mode thus modified constitute processed header segments, as shown in FIG. 7E. Then, in the temporary memory means 15, the framed data for discharge which form the data frame of the SRCDST mode modified to contain the processed header segments and the information segment are obtained.

The destination ID representing the situation wherein the destination is the communication terminal TE2, the destination BD representing the Budget of, for example, −1200 at the destination, the transmission source ID representing the situation wherein the transmission source is the communication terminal TE1 and the BD representing the Budget of, for example, −400 provided in the relay frame header segments in the data frame of the SRCDST mode which is formed by the framed data for discharge obtained in the temporary memory means 15 are preserved in the history information database area provided in the main memory means 17. (Step 46 shown in FIG. 6)

Then, the framed data for discharge which form the data frame of the SRCDST mode modified to contain the processed header segments and the information segment and are obtained in the temporary memory means 15 are discharged from the temporary memory means 15 to the reassembling and segmenting portion 14. Thereby, an output communication signal produced based on the data frame of the SRCDST mode containing the processed header segments constituted with the relay frame header segment wherein the TM information constituted with 2-bit data: "1 0" representing the percolation transfer mode, the destination ID representing the situation wherein the destination is the communication terminal TE2, the destination BD representing the Budget of, for example, −1200 at the destination, the transmission source ID representing the situation wherein the transmission source is the communication terminal TE1, the BD representing the Budget of, for example, −400 and other information are provided and the frame header segment, together with the information segment, is transmitted from one of the signal receiving and transmitting portions 13a to 13n, so that the data frame of the SRCDST mode containing the relay frame header segment wherein the TM information constituted with 2-bit data: "1 0" representing the percolation transfer mode and other identification information are provided, the frame header segment and the information segment is transmitted at the predetermined probability to be relayed through the relay node constituted with the embodiment shown in FIG. 2. (Step 47 shown in FIG. 6)

On the contrary, the data frame of the SRCDST mode which is set to be deleted with the aforementioned relay probability (the transfer probability or the percolation probability), is deleted without being discharged from the temporary memory means 15 to the reassembling and segmenting portion 14 in the form of framed data for discharge.

When the TM information provided in the relay frame header segment in the data frame of the SRCDST mode stored temporarily in the temporary memory means 15 is not constituted with 2-bit data: "1 1" representing the diffusion transfer mode as a result of the aforementioned check (Step 41 shown in FIG. 6), it is checked on the strength of the TM information in question whether the transfer mode of the data frame of the SRCDST mode stored temporarily in the temporary memory means 15 is the convergence transfer mode or not. (Step 51 shown in FIG. 6) When the TM information contained in the relay frame header segment in the data frame of the SRCDST mode stored temporarily in the temporary memory means 15 is constitute with 2-bit data: "0 1" representing the convergence transfer mode and therefore the transfer mode of the data frame of the SRCDST mode stored temporarily in the temporary memory means 15 is the convergence transfer mode, it is checked whether information of the communication terminal TE2 provided as the destination represented by the destination ID contained in the relay frame header segment in the data frame of the SRCDST mode stored temporarily in the temporary memory means 15 has been registered as information representing a registered communication terminal in the history information database area provided in the main memory means 17 or not. (Step 52 shown in FIG. 6)

When the information of the communication terminal TE2 provided as the destination has been registered as the information representing the registered communication terminal in the history information database area provided in the main memory means 17, the data frame of the SRCDST mode stored temporarily in the temporary memory means 15 is discharged from the temporary memory means 15 to the reassembling and segmenting portion 14 in the form of framed data for discharge for communication terminals. As a result, an output communication signal produced based on the data frame of the SRCDST mode containing the relay frame header segment wherein the TM information constituted with 2-bit data: "0 1" representing the convergence transfer mode, the destination ID representing the situation wherein the destination is the communication terminal TE2 and so on are provided, the frame header segment and the information segment, is transmitted from the signal receiving and transmitting portion 12, so that data transmission to the communication terminal TE2 provided as the destination is carried out. (Step 53 shown in FIG. 6)

On the contrary, when the information of the communication terminal TE2 provided as the destination has not been registered as the information representing the registered communication terminal in the history information database area provided in the main memory means 17, the transfer mode of the data frame of the SRCDST mode stored temporarily in the temporary memory means 15 is set to be the convergence transfer mode and the TM information provided in the relay frame header segment in data frame of the SRCDST mode stored temporarily in the temporary memory means 15 in maintained to be constituted with 2-bit data: "0 1" representing the convergence transfer mode without being changed. (Step 48 shown in FIG. 6)

Next, the Budget represented by the BD provided in the relay frame header segment in the data frame of the SRCDST mode stored temporarily in the temporary memory means 15 is reduced by 200. (Step 45 shown in FIG. 6) Thereby, the data frame of the SRCDST mode stored temporarily in the temporary memory means 15 is modified to contain the relay frame header segment wherein the TM information constituted with 2-bit data: "0 1" representing the convergence transfer mode, the destination BD representing the Budget reduced by 200 and so on are provided, the frame header segment successive to the relay frame header segment and the information segment successive to the frame header segment. The relay frame header segment and the frame header segment in the data frame of the SRCDST mode thus modified constitute processed header segments. Then, in the temporary memory means 15, the framed data for discharge which form the data frame of the SRCDST mode modified in the manner mentioned above are obtained.

The destination ID, the destination BD, the transmission source ID and the BD provided in the relay frame header segments in the data frame of the SRCDST mode which is formed by the framed data for discharge obtained in the temporary memory means 15 are preserved in the history information database area provided in the main memory means 17. (Step 46 shown in FIG. 6) After that, the framed data for discharge which form the data frame of the SRCDST mode modified to contain the processed header segments and the information segment and are obtained in the temporary memory means 15 are discharged from the temporary memory means 15 to the reassembling and segmenting portion 14.

Thereby, an output communication signal produced based on the data frame of the SRCDST mode containing the processed header segments constituted with the relay frame header segment wherein the TM information constituted with 2-bit data: "0 1" representing the convergence transfer mode, the destination BD and so on are provided and the frame header segment, together with the information segment, is transmitted from one of the signal receiving and transmitting portions 13a to 13n, so that the data frame of the SRCDST mode containing the relay frame header segment wherein the TM information constituted with 2-bit data: "0 1" representing the convergence transfer mode and other identification information are provided, the frame header segment and the information segment is convergently transmitted to be relayed through the relay node constituted with the embodiment shown in FIG. 2. (Step 47 shown in FIG. 6)

When the transfer mode of the data frame of the SRCDST mode stored temporarily in the temporary memory means 15 is not the convergence transfer mode, as a result of the aforementioned check (Step 51 shown in FIG. 6), since the transfer mode of the data frame of the SRCDST mode stored temporarily in the temporary memory means 15 is the percolation transfer mode, it is checked whether the Budget at the communication terminal TE2 provided as the destination represented by the destination ID contained in the relay header segment in the data frame of the SRCDST mode stored temporarily in the temporary memory means 15, which is preserved in the history information database area provided in the main memory means 17, is larger than zero or not. (Step 54 shown in FIG. 6)

When the Budget at the destination represented by the destination ID provided in the relay frame header segment in the data frame of the SRCDST mode stored temporarily in the temporary memory means 15, which is preserved in the history information database area provided in the main memory means 17, is not larger than zero, the transfer mode of the data frame of the SRCDST mode stored temporarily in the temporary memory means 15 is set to be the percolation transfer mode and the TM information provided in the relay frame header segment in data frame of the SRCDST mode stored temporarily in the temporary memory means 15 is maintained to be constituted with 2-bit data: "1 0" representing the percolation transfer mode without being changed. (Step 49 shown in FIG. 6)

Next, the data frame of the SRCDST mode containing the relay frame header segment wherein the TM information constituted with 2-bit data: "1 0" representing the percolation transfer mode and other identification information are provided, the frame header segment and the information segment is subjected to the probability process, with which the data frame of the SRCDST mode containing the relay frame header segment wherein the TM information constituted with 2-bit data: "1 0" representing the percolation transfer mode and other identification information are provided, the frame header segment and the information segment is controlled to be discharged at a predetermined probability from the temporary memory means 15 to the reassembling and segmenting portion 14 or deleted without being discharged. (Step 50 shown in FIG. 6) In the probability process, the relay probability (transfer probability or percolation probability) of the data frame of the SRCDST mode is set in the same manner as described above. Then, with the relay probability (the transfer probability or the percolation probability) thus set for the data frame of the SRCDST mode which has been subjected to the probability process, the data frame of the SRCDST mode which has been subjected to the probability process is set to be discharged from the temporary memory means 15 to the reassembling and segmenting portion 14 in the form of framed data for discharge or to be deleted.

The destination BD provided in the relay frame header segment in the data frame of the SRCDST mode which is set to be discharged from the temporary memory means 15 to the reassembling and segmenting portion 14 in the form of the framed data for discharge with the aforementioned relay probability (the transfer probability or the percolation probability) is set to represent the preserved destination Budget. Then, the Budget represented by the BD provided in the relay frame header segment in the data frame of the SRCDST mode which is set to be discharged from the temporary memory means 15 to the reassembling and segmenting portion 14 in the form of the framed data for discharge with the aforementioned relay probability (the transfer probability or the percolation probability) is reduced by 200. (Step 45 shown in FIG. 6)

Thereby, in the temporary memory means 15, the framed data for discharge which form the data frame of the SRCDST mode which is set to be discharged from the temporary memory means 15 to the reassembling and segmenting portion 14 with the aforementioned relay probability (the transfer probability or the percolation probability) are obtained. Then, the destination ID, the destination BD, the transmission source ID and the BD provided in the relay frame header segments in the data frame of the SRCDST mode which is formed by the framed data for discharge obtained in the temporary memory means 15 are preserved in the history information database area provided in the main memory means 17. (Step 46 shown in FIG. 6)

After that, the framed data for discharge which form the data frame of the SRCDST mode modified to contain the processed header segments and the information segment and are obtained in the temporary memory means 15 are discharged from the temporary memory means 15 to the reassembling and segmenting portion 14. Thereby, an output communication signal produced based on the data frame of the SRCDST mode containing the processed header segments constituted with the relay frame header segment wherein the TM information constituted with 2-bit data: "1 0" representing the percolation transfer mode and other identification information are provided and the frame header segment, together with the information segment, is transmitted from one of the signal receiving and transmitting portions 13a to 13n, so that the data frame of the SRCDST mode containing the relay frame header segment wherein the TM information constituted with 2-bit data: "1 0" representing the percolation transfer mode and other identification information are provided, the frame header segment and the information segment is transmitted at the predetermined probability to be relayed through the relay node constituted with the embodiment shown in FIG. 2. (Step 47 shown in FIG. 6)

On the contrary, the data frame of the SRCDST mode which is set to be deleted with the aforementioned relay probability (the transfer probability or the percolation probability), is deleted without being discharged from the temporary memory means 15 to the reassembling and segmenting portion 14 in the form of framed data for discharge.

When the Budget at the destination represented by the destination ID provided in the relay frame header segment in the data frame of the SRCDST mode stored temporarily in the temporary memory means 15, which is preserved in the history information database area provided in the main memory means 17, is larger than zero, the transfer mode of the data frame of the SRCDST mode stored temporarily in the temporary memory means 15 is set to be the convergence transfer mode and the TM information provided in the relay frame header segment in data frame of the SRCDST mode stored temporarily in the temporary memory means 15, which is constituted with 2-bit data: "1 1" representing the diffusion transfer mode, is changed to be constituted with 2-bit data: "0 1" representing the convergence transfer mode. (Step 48 shown in FIG. 6)

Next, the Budget represented by the BD provided in the relay frame header segment in the data frame of the SRCDST mode stored temporarily in the temporary memory means 15 is reduced by 200. (Step 45 shown in FIG. 6) Thereby, the data frame of the SRCDST mode stored temporarily in the temporary memory means 15 is modified to contain the relay frame header segment wherein the TM information constituted with 2-bit data: "0 1" representing the convergence transfer mode and other identification information are provided, the frame header segment successive to the relay frame header segment and the information segment successive to the frame header segment. The relay frame header segment and the frame header segment in the data frame of the SRCDST mode thus modified constitute processed header segments. Then, in the temporary memory means 15, the framed data for discharge which form the data frame of the SRCDST mode modified to contain the processed header segments and the information segment above are obtained. In addition, the destination ID, the destination BD, the transmission source ID and the BD provided in the relay frame header segments in the data frame of the SRCDST mode which is formed by the framed data for discharge obtained in the temporary memory means 15 are preserved in the history information database area provided in the main memory means 17. (Step 46 shown in FIG. 6)

After that, the framed data for discharge which form the data frame of the SRCDST mode modified to contain the processed header segments and the information segment and are obtained in the temporary memory means 15 are discharged from the temporary memory means 15 to the reassembling and segmenting portion 14. Thereby, an output communication signal produced based on the data frame of the SRCDST mode containing the processed header segments constituted with the relay frame header segment wherein the TM information constituted with 2-bit data: "0 1" representing the convergence transfer mode and other identification information are provided and the frame header segment, together with the information segment, is transmitted from one of the signal receiving and transmitting portions 13a to 13n, so that the data frame of the SRCDST mode containing the relay frame header segment wherein the TM information constituted with 2-bit data: "0 1" representing the convergence transfer mode and other identification information are provided, the frame header segment and the information segment is convergently transmitted to be relayed through the relay node constituted with the embodiment shown in FIG. 2. (Step 47 shown in FIG. 6)

As described above, in the relay node constituted with the embodiment shown in FIG. 2, when the data frame formed by the framed data for storage which are obtained from the reassembling and segmenting portion 14 based on the input information signal from one of the signal receiving and transmitting portions 12 and 13a to 13n is detected, the temporary managing portion 16 and the main managing portion 18, each of which operates under the control by the operation control portion 20, carry out the first control operation or the second control operation. With the first control operation, the TM information which is to be provided in the header segment contained in a modified data frame mentioned below is determined to represent one of the diffusion transfer mode, the percolation transfer mode and the convergence transfer mode based on the original transfer mode information and the particular identification information both provided in the header segment contained in the detected data frame and the history information preserved in the history information database area provide in the main memory means 17, the detected data frame is transformed to be the modified data frame containing the header segment wherein the determined transfer mode information is provided, and the modified data frame thus obtained is positively discharged in the form of the framed data for discharge from the temporary memory means 15 to the reassembling and segmenting portion 14 or discharged at the predetermined probability in the form of the framed data for discharge from the temporary memory means 15 to the reassembling and segmenting portion 14 or deleted in response to the determined transfer mode information. With the second control operation, the detected data frame is deleted in response to the transfer mode information and the predetermined identification information both provided in the header segment contained in the detected data frame and the history information preserved in the history information database area provided in the main memory means 17. When the modified data frame containing the header segment wherein the determined transfer mode information is provided is discharged in the form of the framed data for discharge from the temporary memory means 15 to the reassembling and segmenting portion 14, the output information signal produced based on the framed data for discharge is supplied to one of the signal receiving and transmitting portions 12 and 13a to 13n from the reassembling and segmenting portion 14 and then the output communication signal based on the output information signal thus supplied is transmitted from one of the signal receiving and transmitting portions 12 and 13a to 13n, so that the detected data frame is transferred as the modified date frame containing the header segment wherein the determined transfer mode information is provided.

In the relay node constituted with the embodiment shown in FIG. 2, when the data frame containing the header segment and the information segment, which is obtained based on the input communication signal received by one of the signal receiving and transmitting portions 12 and 13a to 13n, is detected, the control operations with which the detected data frame is transferred as the modified data frame containing the header segment wherein the transfer mode information representing the diffusion transfer mode, the percolation transfer mode or the convergence transfer mode is provided when the transfer of the detected data frame ought to be done and the detected data frame is deleted when there is no necessity for transferring the detected data frame, is autonomously carried out. These control operations can be carried out without using any communication channel information related to the data frame containing the header segment and the information segment and obtained based on the input communication signal received by one of the signal receiving and transmitting portions 12 and 13a to 13n and regardless of the number of transfers, that is, the number of relaying stages.

Therefore, in the wireless mesh network constituted with a plurality of relay nodes, each of which is constituted with the embodiment in FIG. 2, communication information from a transmission source is relayed by the relay nodes to be transferred to a destination thereof with the number of relaying stages which can be freely set without restriction by the amount of communication information to be processed, and consequently, a multistage-relayed communication extending over the long distance can be carried out to realize a long-distance communication.

Figure 8:
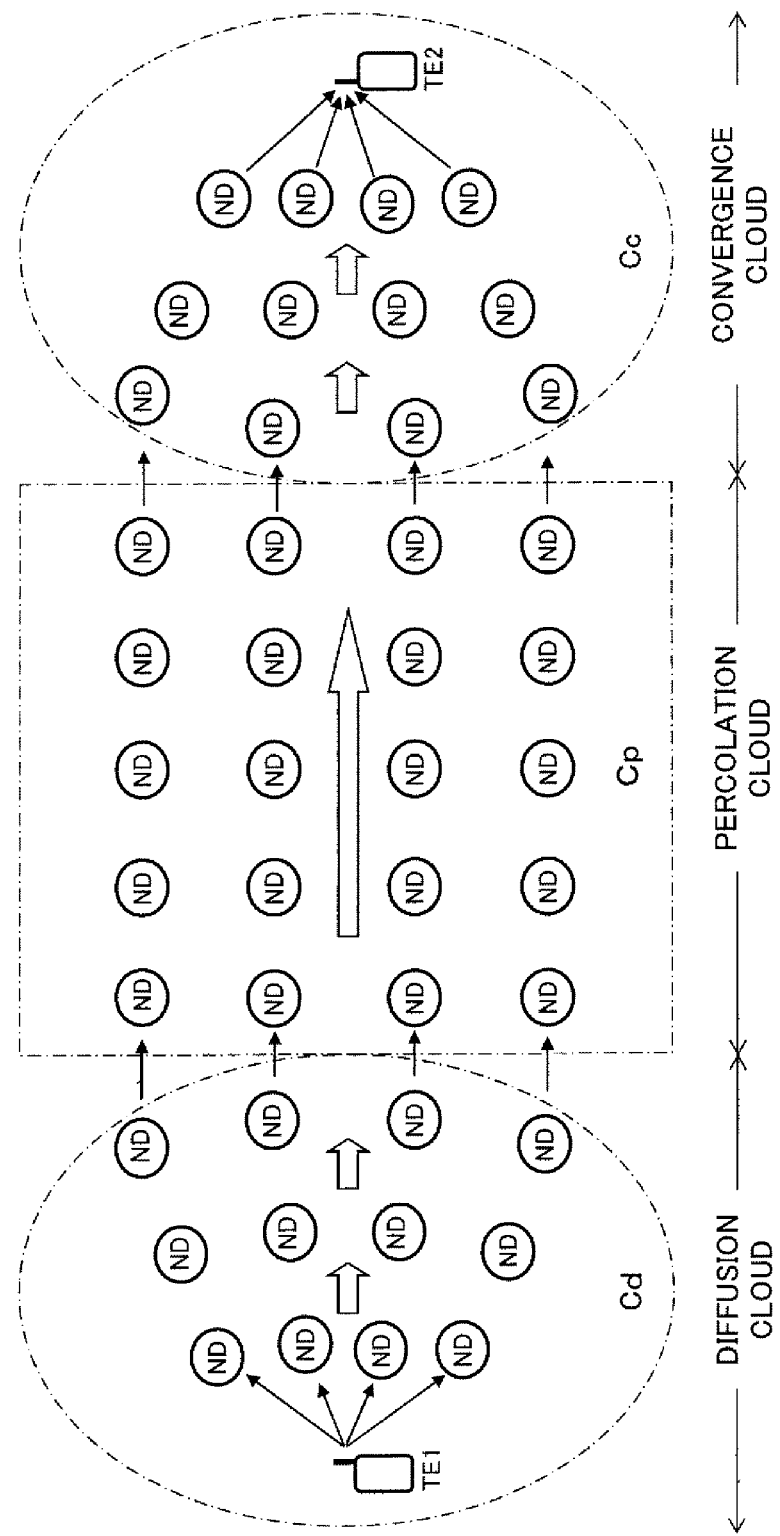
FIG. 8 is a schematic illustration used for explaining a condition for transferring a communication signal transmitted from a transmission source to be relayed to a destination through a communication network constituted with a plurality of relay nodes, each of which can be constituted with the embodiment shown in FIG. 2.

FIG. 8 shows schematically and conceptually a condition for transferring a communication signal transmitted from a transmission source to be relayed to a destination through a communication network constituted with a plurality of relay nodes, each of which is constituted with the embodiment shown in FIG. 2.

In FIG. 8, a communication terminal TE1 is the transmission source and another communication terminal TE2 is the destination so that the communication signal is transmitted from the communication terminal TE1 to be relayed to the communication terminal TE2. A plurality of circles, each of which surrounds "ND", represent the relay nodes, each of which is constituted with the embodiment shown in FIG. 2, and which are dispersedly arranged in such a manner that each contiguous two of the relay nodes are placed with their communication areas overlapping partially with each other. When information communication is carried out, a Budget represented by a BD contained in a relay frame header segment in a data frame formed by a communication signal transmitted from the communication terminal TE1 provided as the transmission source is, for example, 1000 at the communication terminal TE1 and then reduced, for example, by 200 at every transit of the communication signal through the relay node.

Each of the communication terminal TE1 and the relay nodes arranged substantially in the vicinity of the communication terminal TE1 belongs to the same node group. Such a node group is referred to as a cloud, hereinafter. The node group to which each of the communication terminal TE1 and the relay nodes placed substantially in the vicinity of the communication terminal TE1 belongs is a cloud Cd.

In the history information database area provided in the main memory means 17 shown in FIG. 2 in each of the relay nodes forming a part of the cloud Cd, information of the communication terminal TE1 provided as the transmission source has been preserved as information recognizing that the communication terminal TE1 is a registered communication terminal. At each of the relay nodes belonging to the cloud Cd, when the communication signal transmitted from the communication terminal TE1 is received as an input communication signal by one of the signal receiving and transmitting portions 12 and 13a to 13n, the Budget represented by the BD contained in the relay frame header segment in the data frame of the SRCDST which is stored temporarily in the temporary memory means 15 is larger than 200.

The relay nodes belonging to the cloud Cd are operative to relay in sequence the data frame of the SRCDST based on the communication signal transmitted from the communication terminal TE1, in which the relay frame header segment contains the TM information constituted with 2-bits data "1 1" representing the diffusion transfer mode, so that the data frame of the SRCDST based on the communication signal transmitted from the communication terminal TE1 is transmitted diffusively. Each of the relay nodes positioned at the outer edge portion of the cloud Cd serves the outside of the cloud Cd as a quasi-transmission source of the communication signal. Accordingly, the cloud Cd is called a diffusion cloud.

At the outside of the cloud Cd, the relay nodes belonging to a cloud Cp successive to the cloud Cd are arranged. At each of the relay nodes belonging to the cloud Cp, when the communication signal transmitted from the communication terminal TE1 is received as an input communication signal by one of the signal receiving and transmitting portions 12 and 13a to 13n, the Budget represented by the BD contained in the relay frame header segment in the data frame of the SRCDST which is stored temporarily in the temporary memory means 15 is not larger then zero.

The relay nodes belonging to the cloud Cp are operative to relay in sequence the data frame of the SRCDST based on the communication signal transmitted from the communication terminal TE1, which has passed the relay node positioned at the outer edge portion of the cloud Cd and serving the outside of the cloud Cd as the quasi-transmission source of the communication signal and in which the relay frame header segment contains the TM information constituted with 2-bits data "1 0" representing the percolation transfer mode, so that the data frame of the SRCDST based on the communication signal transmitted from the communication terminal TE1 is relayed to percolate into the cloud Cp at a predetermined probability so as to be transmitted at the predetermined probability.

This means that, in the cloud Cp, the data frame of the SRCDST based on the communication signal transmitted from the communication terminal TE1, which has passed through the cloud Cd, is relayed by the relay node to percolate into the cloud Cp at the relay probability which is set on the strength of a result of comparison between a header destination Budget of the data frame of the SRCDST in question and a preserved destination Budget of the data frame of the SRCDST in question or delayed without being relayed by the relay node. The cloud Cp is called a percolation cloud.

A cloud Cc is successive to the cloud Cp. Each of the communication terminal TE2 provided as the destination of the communication signal transmitted from the communication terminal TE1 and the relay nodes arranged substantially in the vicinity of the communication terminal TE2 belongs to the cloud Cc. In the history information database area provided in the main memory means 17 shown in FIG. 2 in each of the relay nodes forming a part of the cloud Cc, information of the communication terminal TE2 provided as the destination has been preserved as information recognizing that the communication terminal TE2 is a registered communication terminal. At each of the relay nodes belonging to the cloud Cd, when the communication signal transmitted from the communication terminal TE1 is received as an input communication signal and an output communication signal produced on the basis of the data frame of the SRCDST based on the communication signal transmitted from the communication terminal TE1 is transmitted by one of the signal receiving and transmitting portions 12 and 13a to 13n, the Budget represented by the BD contained in the relay frame header segment in the data frame of the SRCDST applied for producing the output communication signal is a certain value, for example, a value larger than 200.

The relay nodes belonging to the cloud Cc are operative to relay in sequence the data frame of the SRCDST based on the communication signal transmitted from the communication terminal TE1, in which the relay frame header segment contains the TM information constituted with 2-bits data "0 1" representing the convergence transfer mode, to converge to the communication terminal TE2 provided as the destination or to transmit the data frame of the SRCDST based on the communication signal transmitted from the communication terminal TE1, in which the relay frame header segment contains the TM information constituted with 2-bits data "0 1" representing the convergence transfer mode, directly to the communication terminal TE2 provided as the destination, so that the data frame of the SRCDST based on the communication signal transmitted from the communication terminal TE1 is transmitted convergently to the destination. The cloud Cc is called a convergence cloud.

In such a manner as described above, in the example shown in FIG. 8, the communication signal transmitted from the communication terminal TE1 provided as the transmission source is transmitted through a state of diffusion transmission in the cloud Cd, a state of percolation transmission in the cloud Cp and a state of convergence transmission to the communication terminal TE2 provided as the destination. Consequently, the communication information transmitted from the communication terminal TE1 provided as the transmission source is relayed by the relay nodes to be transferred to the communication terminal TE2 provided as the destination with the number of relaying stages which can be freely set without restriction by the amount of communication information to be processed, and consequently, a multistage-relayed communication extending over a long distance can be carried out to realize a long-distance communication.

APPLICABILITY FOR INDUSTRIAL USE

As apparent from the above description, the communication apparatus according to the present invention can be broadly applied to constitute each of relay nodes provided to constitute a novel wireless communication network, with which advantages exceeding the advantages obtained with the known mesh network are obtained and in which communication information from a transmission source is relayed by the relay nodes to be transferred to a destination with the number of relaying stages which can be freely set without restriction by the amount of communication information to be processed, and consequently, a multistage-relayed communication extending over a long distance can be carried out to realize a long-distance communication.

The invention claimed is:

1. A communication apparatus comprising:
   a signal receiving and transmitting portion operative to receive an input communication signal for obtaining an input information signal and to transmit an output communication signal based on an output information signal;
   a reassembling and segmenting portion operative to cause the input information signal to be subjected to reassembling process for obtaining first framed data which form a data frame containing a header segment and an information segment and to cause second framed data which form a data frame containing a processed header segment and an information segment to be subjected to segmenting process for obtaining the output information signal;
   temporary memory means for storing temporarily the first framed data obtained from the reassembling and segmenting portion and for storing temporarily the second framed data and then discharging the second framed data stored therein to the reassembling and segmenting portion;
   main memory means for storing therein identification information contained in the data frame formed by the first framed data stored in the temporary memory means, preserving the stored identification information as history information, as occasion demands, and discharging one of the stored identification information and the stored identification information having been subjected to modifying process to the temporary memory means as processed identification information so as to be provided in the processed header segment contained in the data frame formed by the second framed data;
   a temporary managing portion operative to control operations in the temporary memory means for storing temporarily therein the first and second framed data;
   a main managing portion operative to control operations in the main memory means for storing therein the identification information, preserving the history information and discharging the processed identification information; and
   an operation control portion operative, when the data frame formed by the first framed data obtained form the reassembling and segmenting portion is detected, to cause the temporary managing portion and the main managing portion to carry out one of a first control operation, with which the detected data frame is transformed to be a modified data frame containing a header segment wherein a transfer mode information representing one of a diffusion transfer mode, a percolation transfer mode and a convergence transfer mode, which is determined based on original transfer mode information and particular identification information both provided in the header segment contained in the detected data frame and the history information preserved in the main memory means, the modified data frame containing the header segment wherein the transfer mode information representing one of the diffusion transfer mode and the convergence transfer mode is provided is positively discharged in the form of the second framed data from the temporary memory means to the reassembling and segmenting portion, and the modified data frame containing the header segment wherein the transfer mode information representing the percolation transfer mode is provided is discharged at a predetermined probability in the form of the second framed data from the temporary memory means to the reassembling and segmenting portion or deleted without being discharged, and a second control operation, with which the detected data frame is deleted in response to a transfer mode information and a predetermined identification information both provided in the header segment contained in the detected data frame and the history information preserved in the main memory means;

wherein, in the diffusion transfer mode, the data frame containing the header segment wherein the transfer mode information representing the diffusion transfer mode is provided is identical with one of a data frame transmitted from a transmission source and a data frame transmitted diffusively, in the percolation transfer mode, the data frame containing the header segment wherein the transfer mode information representing the percolation transfer mode is provided is identical with a data frame transmitted at a predetermined probability, and in the convergence transfer mode, the data frame containing the header segment wherein the transfer mode information representing the convergence transfer mode is provided is identical with a data frame transmitted convergently toward a destination thereof.

2. A communication apparatus according to claim 1, wherein said particular identification information is one of information representing one of the transmission source and the destination and information representing a value which varies at every transmission of the detected frame data after the first transmission thereof at the transmission source.

3. A communication apparatus according to claim 1, wherein said operation control portion is operative further to cause the temporary managing portion and the main managing portion to perform one of a third control operation for preventing the transfer mode information provided in the header segment contained in the modified data frame from changing and a fourth control operation for changing the transfer mode information provided in the header segment contained in the modified data frame into a different transfer mode information.

4. A communication apparatus according to claim 1, wherein said operation control portion is operative further, when the detected data frame contains the header segment wherein the transfer mode information representing the convergence transfer mode, to cause the temporary managing portion and the main managing portion to perform one of a third control operation for setting the detected data frame to be transmitted to the destination and a fourth control operation for setting the detected data frame to be discharged in the form of the second framed data from the temporary memory means to the reassembling and segmenting portion, in response to identification information of the destination contained in the header segment in the detected data frame and the history information preserved in the main memory means.

5. A communication apparatus according to claim 1, wherein said operation control portion is operative further, when the detected data frame contains the header segment wherein the transfer mode information representing the percolation transfer mode, to cause the temporary managing portion and the main managing portion to perform one of a third control operation for modifying the detected data frame to contains the header segment wherein the transfer mode information representing the convergence transfer mode and for setting the modified detected data frame to be discharged in the form of the second framed data from the temporary memory means to the reassembling and segmenting portion, and a fourth control operation for setting the detected data frame to be discharged in the form on the second framed data at a predetermined probability from the temporary memory means to the reassembling and segmenting portion or deleted without being discharged, in response to identification information of the destination contained in the header segment in the detected data frame and the history information preserved in the main memory means.

6. A communication apparatus according to claim 1, wherein said operation control portion is operative, when the data frame formed by the first framed data obtained from the reassembling and segmenting portion is detected as one of a reflected data frame and a duplicate data frame, to cause the temporary managing portion and the main managing portion to perform a third control operation for deleting the detected data frame.

* * * * *